(12) United States Patent
Jiang et al.

(10) Patent No.: US 9,684,094 B2
(45) Date of Patent: Jun. 20, 2017

(54) PHOTONIC CRYSTAL SUPPORTING HIGH FREQUENCY SENSITIVITY SELF-COLLIMATION PHENOMENON AND DESIGN METHOD AND USE THEREOF

(71) Applicants: SHANGHAI INSTITUTE OF MICROSYSTEM AND INFORMATION TECHNOLOGY, CHINESE ACADEMY OF SCIENCES, Shanghai (CN); FUDAN UNIVERSITY, Shanghai (CN)

(72) Inventors: Xunya Jiang, Shanghai (CN); Xulin Lin, Shanghai (CN); Xiaogang Zhang, Shanghai (CN); Wei Li, Shanghai (CN); Liang Chen, Shanghai (CN)

(73) Assignees: SHANGHAI INSITUTE OF MICROSYSTEM AND INFORMATION TECHNOLOGY, CHINESE ACADEMY OF SCIENCES, Changing District, Shanghai (CN); FUDAN UNIVERSITY, Shanghai (CN)

( * ) Notice: Subject to any disclaimer, the term of this patent is extended or adjusted under 35 U.S.C. 154(b) by 0 days.

(21) Appl. No.: 14/761,612

(22) PCT Filed: Mar. 28, 2014

(86) PCT No.: PCT/CN2014/074280
§ 371 (c)(1),
(2) Date: Jul. 16, 2015

(87) PCT Pub. No.: WO2015/078119
PCT Pub. Date: Jun. 4, 2015

(65) Prior Publication Data
US 2016/0259090 A1    Sep. 8, 2016

(30) Foreign Application Priority Data

Nov. 27, 2013  (CN) .......................... 2013 1 0625054

(51) Int. Cl.
*G02B 1/00* (2006.01)
*G02F 1/35* (2006.01)
*G02B 6/122* (2006.01)

(52) U.S. Cl.
CPC ........... *G02B 1/005* (2013.01); *G02B 6/1225* (2013.01); *G02F 1/3511* (2013.01)

(58) Field of Classification Search
CPC ...... G02B 6/1225; G02B 1/005; G02F 1/3511
See application file for complete search history.

(56) References Cited

U.S. PATENT DOCUMENTS 6,093,246 A * 7/2000 Lin .................... B82Y 20/00
117/92
2004/0170352 A1* 9/2004 Summers ............... B82Y 20/00
385/16

(Continued)

FOREIGN PATENT DOCUMENTS

CN    101055397 A    10/2007
CN    101345588 A    1/2009

(Continued)

*Primary Examiner* — Daniel Petkovsek
(74) *Attorney, Agent, or Firm* — Global IP Services; Tianhua Gu

(57) ABSTRACT

A photonic crystal supporting highly frequency-sensitive self-collimation phenomenon, which is formed by at least two kinds of materials, and has a periodic distribution of refractive index, the photonic crystal has straight equi-frequency contours or flat equi-frequency surfaces in a certain band in the first Brillouin zone of wave-vector space, and the frequency-sensitivity of self-collimation is at least (Continued)

50 times higher than the change rate of curvatures of the equi-frequency contours or the equi-frequency surfaces with frequencies in a vacuum.

5 Claims, 24 Drawing Sheets

(56) References Cited

U.S. PATENT DOCUMENTS

| | | | |
|---|---|---|---|
| 2005/0226562 A1* | 10/2005 | Romagnoli | B82Y 20/00 385/39 |
| 2007/0297734 A1 | 12/2007 | Ibanescu et al. | |
| 2008/0304787 A1 | 12/2008 | Kittaka et al. | |

FOREIGN PATENT DOCUMENTS

| | | |
|---|---|---|
| CN | 102231034 A | 11/2011 |
| CN | 202916550 U | 5/2013 |

* cited by examiner

PHOTONIC CRYSTAL SUPPORTING HIGH FREQUENCY SENSITIVITY SELF-COLLIMATION PHENOMENON AND DESIGN METHOD AND USE THEREOF

CROSS REFERENCE TO RELATED PATENT APPLICATION

The present application is the US national stage of PCT/CN2014/074280 filed on Mar. 28, 2014, which claims the priority of the Chinese patent applications No. 201310625054.2 filed on Nov. 27, 2013, which applications are incorporated herein by reference.

BACKGROUND OF THE PRESENT INVENTION

Field of Invention

The present invention relates to a field of artificial material, particularly relates to a photonic crystal supporting high frequency sensitivity self-collimation phenomenon and design method and use thereof.

Description of Related Arts

Photonic crystals are artificial materials for controlling electromagnetic wave propagation, which are characterized with a periodic distribution of refractive index and a dispersion relation of photonic band-gap structure. Photonic crystals have rich and controllable dispersion properties, and can be used to construct various integratable optical elements with micro-scales. The self-collimation phenomenon of photonic crystals [H. Kosaka et al., Phys. Rev. B 74,1912 (1999); J. Witzens et al., IEEE Journal of Selected Topics in Quantum Electronics, 8, 1246(2002)] is a special dispersion relation inside a band of the photonic crystals, which ensures that a light beam of finite width maintains collimated during the propagation in a photonic crystal without boundary limits or participation of nonlinear effect. With regard to a two dimensional photonic crystal and a photonic crystal slab, the self-collimation phenomenon originates in straight equi-frequency contours; while with regard to a three dimensional photonic crystal, the self-collimation phenomenon originates in flat equi-frequency surfaces. It has been revealed in prior literatures that, the self-collimation phenomenon of photonic crystals can be used as a flexible waveguiding mechanism with very strong anti-crosstalk capability [X. Yu and S. Fan, Appl. Phys. Lett. 83, 3251 (2003); P. T. Rakich et al., Nature Materials 5, 93 (2006)]. Further, it also has been revealed in literatures that, the self-collimation phenomenon of photonic crystals can be used to design various integratable optical elements, such as interferometer [D. Zhao et al., Appl. Phys. Lett. 90, 231114 (2007)], filter [X. Chen et al, Optics Express, 17, 19808 (2009)] and beam splitter [V. Zabelin et al., Optics Letters, 530 (2007)] and the like.

A strict establishment for the self-collimation phenomenon requires that the curvature of the equi-frequency contours (or equi-frequency surfaces) is zero, which is satisfied only at some specific frequencies, while those specific frequencies are named as self-collimation frequency, and midpoints of the equi-frequency contours (or equi-frequency surfaces) with curvature being equal to zero are named as self-collimation point. Normally, self-collimation phenomenon is approximately established within a certain frequency range with curvature of the equi-frequency contours being close to zero around a self-collimation frequency. The width of the frequency range depends on the change rate of curvatures of the equi-frequency contours over the frequency around the self-collimation frequency. The change rate of curvatures of the equi-frequency contours over the frequency around the self-collimation frequency may also be named as self-collimation frequency sensitivity, since it describes the sensitivity of self-collimation phenomenon to frequency change. Currently, the disclosed literatures on the optimizing of self-collimation phenomenon are mostly to decrease the self-collimation frequency sensitivity, such that the self-collimation phenomenon is approximately established within a wider frequency range [R. E. Hamam et al., Optics Express, 17, 8109-8118 (2009); Y-C Chuang, T. J. Suleski, J. Opt., 12, 035102(2010)].

It should be pointed out that, it is of significant importance to improve the self-collimation frequency sensitivity. For example, according to the disclosed information in the literature [X. Jiang et al., Appl. Phys. Lett., 91, 031105 (2007); Z. Xu et al., Optics Letters, 33, 1762 (2008)], around the self-collimation frequency, variations of refractive index caused by optical nonlinearities will make degree of diffraction change among positive, zero, and negative value, while the change of degree of diffraction will in turn affect the intensity of optical nonlinearities, thereby forming novel physical phenomena such as optical solution, self-locking effect of beam width and the like; the improvement of self-collimation frequency sensitivity can help to enhance the interaction between diffraction and optical nonlinearities around the self-collimation frequency, thereby significantly decreasing the required lowest energy intensity for those physical phenomenon. Moreover, it can be predicted that, the improvement of self-collimation frequency sensitivity also can help to improve the performance of a number of existing photonic crystal devices based on self-collimation phenomenon, and to make new designs of novel photonic crystal devices become feasible.

Therefore, it becomes an urgent technical issue for those skilled in the art that how to provide a photonic crystal supporting high frequency sensitivity self-collimation phenomenon and design method and use thereof.

SUMMARY OF THE PRESENT INVENTION

In view of the above disadvantages in the prior art, the object of the present invention is to provide a photonic crystal supporting high frequency sensitivity self-collimation phenomenon.

Another object of the present invention is to provide a design method for the photonic crystal supporting high frequency sensitivity self-collimation phenomenon.

Another object of the present invention is to provide a method for controlling diffraction of light beams based on a photonic crystal supporting high frequency sensitivity self-collimation phenomenon.

Another object of the present invention is to provide a method for detecting refractive index based on a photonic crystal supporting high frequency sensitivity self-collimation phenomenon.

In order to achieve the above objects and other related objects, the present invention provides a photonic crystal supporting high frequency sensitivity self-collimation phenomenon, which has a periodic distribution of refractive index formed by at least two kinds of materials; there exists straight equi-frequency contours or flat equi-frequency surfaces in a certain band in the dispersion space of the photonic crystal, and change rate of curvatures of the equi-frequency contours or the equi-frequency surfaces with frequencies around the frequency of straight equi-frequency contours or flat equi-frequency surfaces is at least increased at least 50 times than the change rate in vacuum.

The present invention also provides a design method for the photonic crystal supporting high frequency sensitivity self-collimation phenomenon, which at least includes:

1) Based on the types of crystal lattice, material and structural parameters of the photonic crystal, calculating the dispersion relation of the photonic crystals, so as to form equi-frequency diagrams and to determine a candidate photonic crystal that supports a self-collimation point and van Hove singularities inside the Brillouin zone within the same band; the material parameters of the photonic crystal comprises refractive indexes of the materials that constitutes the photonic crystal, while the structural parameters of the photonic crystal comprises shapes and sizes of the materials that constitutes the photonic crystal and lattice lengths of each directions thereof; the van Hove singularities located in a Brillouin zone comprises one or more of saddle-point-type van Hove singularities, maximum-point-type van Hove singularities or minimum-point-type van Hove singularities;

2) Changing the material and structural parameters of the candidate photonic crystal, recalculating the dispersion relation to form equi-frequency diagrams and to determine the key parameter of the photonic crystal, wherein, the key parameter of the photonic crystal refers to, the material and/or structural parameter of the photonic crystal as its value changes, it enables the van Hove singularity move close to or away from the self-collimation point;

3) Based on the dispersion relation around the self-collimation point, determining the distribution of the self-collimation frequency sensitivity γ with the key parameter of the photonic crystal.

4) Selecting a required self-collimation frequency sensitivity γ, determining the value of the key parameter of the photonic crystal and the values of other structural and material parameters of the photonic crystal according to the distribution of the self-collimation frequency sensitivity γ with the key parameter of the photonic crystal.

Preferably, calculate the dispersion relation of the photonic crystal, based on the types of crystal lattice, material and structural parameters of the photonic crystal, and by adopting one of the plane wave expansion method, the FDTD method, and the finite element method.

Preferably, the self-collimation frequency sensitivity γ is calculated according to:

$$\gamma = \left(\frac{1}{c/\omega^2}\right)\partial\kappa/\partial\omega\bigg|_{\omega=\omega_{sc},k_1=0} = \left(\frac{1}{c/\omega^2}\right)\frac{\partial^3\omega}{\partial k_2 \partial k_1^2}/v_g^2\bigg|_{\omega=\omega_{sc},k_1=0},$$

wherein, κ represents curvature of the equi-frequency contour, ω represents frequency of the equi-frequency contour, $\omega_{sc}$ is the frequency of the self-collimation point, $k_1$ represents the wavevector component parallel with the straight equi-frequency contours, $k_2$ represents the wavevector component perpendicular with the straight equi-frequency contours, group velocity $v_g=\sqrt{(\partial\omega/\partial k_1)^2+(\partial\omega/\partial k_2)^2}$, constant c is the velocity of light in vacuum, normalized base $c/\omega^2$ represents an absolute value of change rate of curvature κ of the equi-frequency contours with frequency ω in vacuum.

The present invention further provides a method for controlling diffraction of light beams based on a photonic crystal supporting high frequency sensitivity self-collimation phenomenon, which at least comprises the following steps:

1) Providing a block of photonic crystal supporting high frequency sensitivity self-collimation phenomenon;

2) Launching a light beam to be regulated into the photonic crystal along a self-collimation direction of one side of the provided photonic crystal;

3) Receiving the light beam at the other side of the provided photonic crystal.

Preferably, degree of diffraction of the light beam propagated in the photonic crystal is determined by the curvature of equi-frequency contours.

Preferably, material and structural parameters of the photonic crystal are determined according to the frequency of the light beam and the degree of diffraction intended to be achieved.

Preferably, size of the photonic crystal relative to the self-collimation direction satisfies the condition that: it enables to hold the light beam propagate in the photonic crystal rather than escaping from lateral of the photonic crystal.

Preferably, the method for controlling diffraction of light beam based on a photonic crystal supporting high frequency sensitivity self-collimation phenomenon further comprises: changing the curvature of the equi-frequency contours at the frequency of light beam by changing the refractive index of a constitute or some constitutes of the photonic crystal, so as to change the degree of diffraction of light beam.

The present invention further provides a method for detecting refractive index based on a photonic crystal supporting high frequency sensitivity self-collimation phenomenon, which at least comprises the following steps:

1) Providing a block of photonic crystal supporting high frequency sensitivity self-collimation phenomenon, a light source placed at one side of the photonic crystal and a light intensity detector placed at the other side of the photonic crystal being opposite to the light source; wherein, there are interspaces of periodic configuration inside the photonic crystal; the light source is capable to generate a light beam with specific frequency, width and intensity along with the incident direction of the self-collimation; the light intensity detector is used for detecting the centre intensity of the light beam that emits from the photonic crystal.

2) The interspaces of periodic configuration inside the photonic crystal are filled with multiple materials of known refractive indexes, respectively, to form each first filled photonic crystal;

3) Launching a light beam into each first filled photonic crystal, and detecting a centre intensity of outgoing beam corresponding to each refractive index, so as to determine the relation between each refractive index and the corresponding intensity of the outgoing beam;

4) Filling the photonic crystal with sample to be tested, to form a second filled photonic crystal;

5) Launching a light beam into the second filled photonic crystal, and determining the refractive index of the sample to be tested based on the measured centre intensity of outgoing beam, and the relation between the refractive index and the corresponding intensity of the outgoing beam.

From the above, the photonic crystal supporting high frequency sensitivity self-collimation phenomenon and design method and use thereof of the present invention has the following beneficial effects: the curvatures of equi-frequency contours (equi-frequency surfaces) around the self-collimation point rapid changes with frequency, such that degree of diffraction of light beam is readily influenced by frequency shift and change of material refractive index, thereby enabling to be used to construct devices of excellent property, such as light beam modulator, detector, and optical switch and the like, and having a wide application prospect, etc.

with $n_{bg}$.

Figure 24:
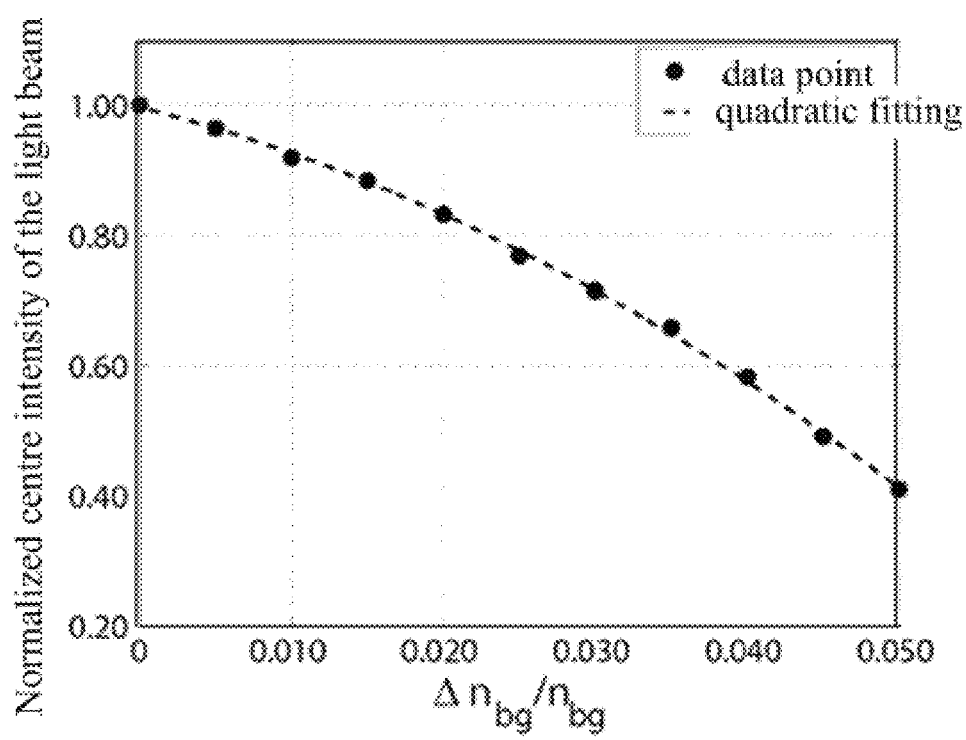

FIG. 24 shows a schematic diagram of changes of the obtained centre intensity of outgoing beam with $n_{bg}$ simulated by FDTD method.

STATEMENT OF ELEMENT LABELS

G1~G4 Step

DETAILED DESCRIPTION OF THE PREFERRED EMBODIMENTS

The embodiment modes of the present invention are described hereunder through specific examples, and persons skilled in the art may easily understand other advantages and efficacies of the present invention from the contents disclosed in the present description. The present invention may be further implemented or applied through other different specific embodiment modes, and various modifications or amendments may also be made to each of the details in the present description based on different perspectives and applications without departing from the spirit of the present invention.

Please refer to FIG. 1 to FIG. 24. It is to be noted that the drawings provided in the present embodiment only explain the basic conception of the present invention in an illustrative manner, so the drawings only display the components relevant to the present invention rather than being drawn according to the number, shape and size of the components during actual implementation, the shape, number and scale of each component may be randomly changed during its actual implementation, and the layout of the components thereof might also be more complicated.

First Embodiment

Figure 1:
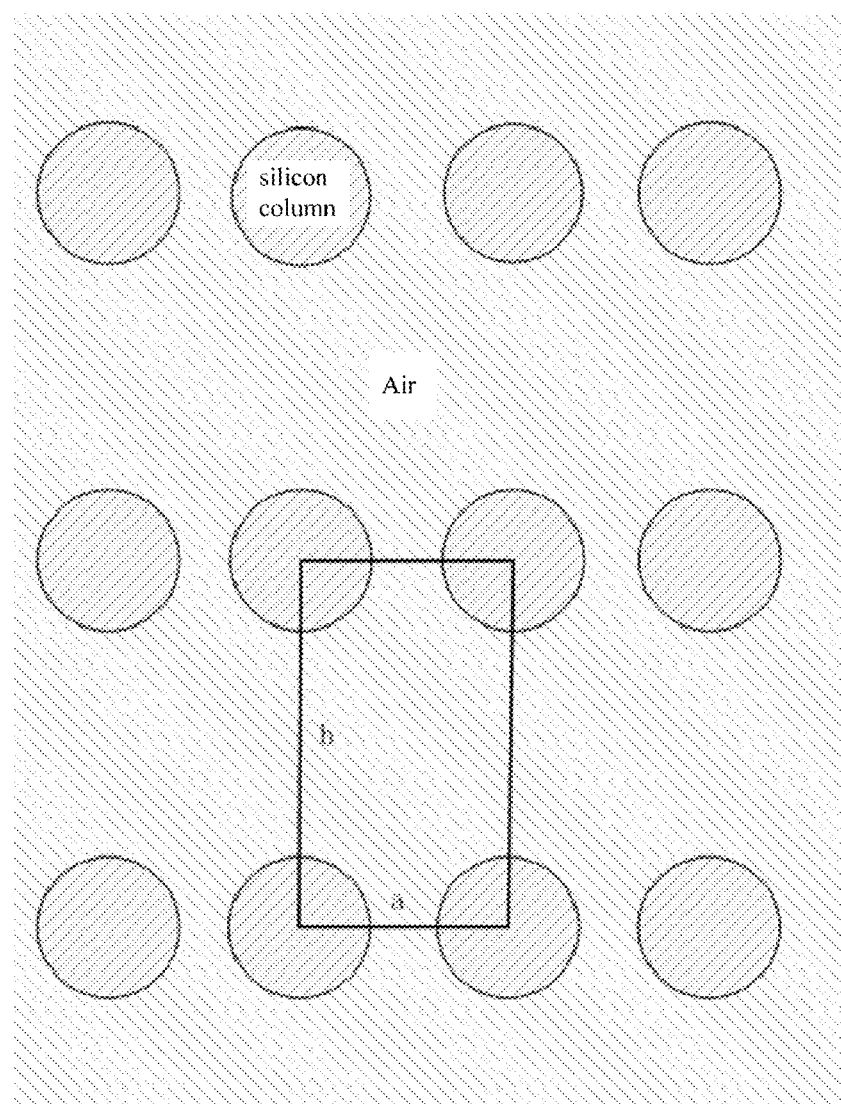
FIG. 1 shows a schematic diagram of a preferable photonic crystal supporting high frequency sensitivity self-collimation phenomenon of the present invention.

FIG. 1 is shown to a schematic diagram of a preferable photonic crystal supporting high frequency sensitivity self-collimation phenomenon. The photonic crystal 1a is made of infinite silicon columns arranged periodically in rectangular lattice in air background, wherein, the silicon column has a radius of 0.30a, a refractive index of the silicon material is n=3.4, the formed rectangular lattice has a length of a at the short side, and a length of b=1.8a at the long side.

Figure 2:
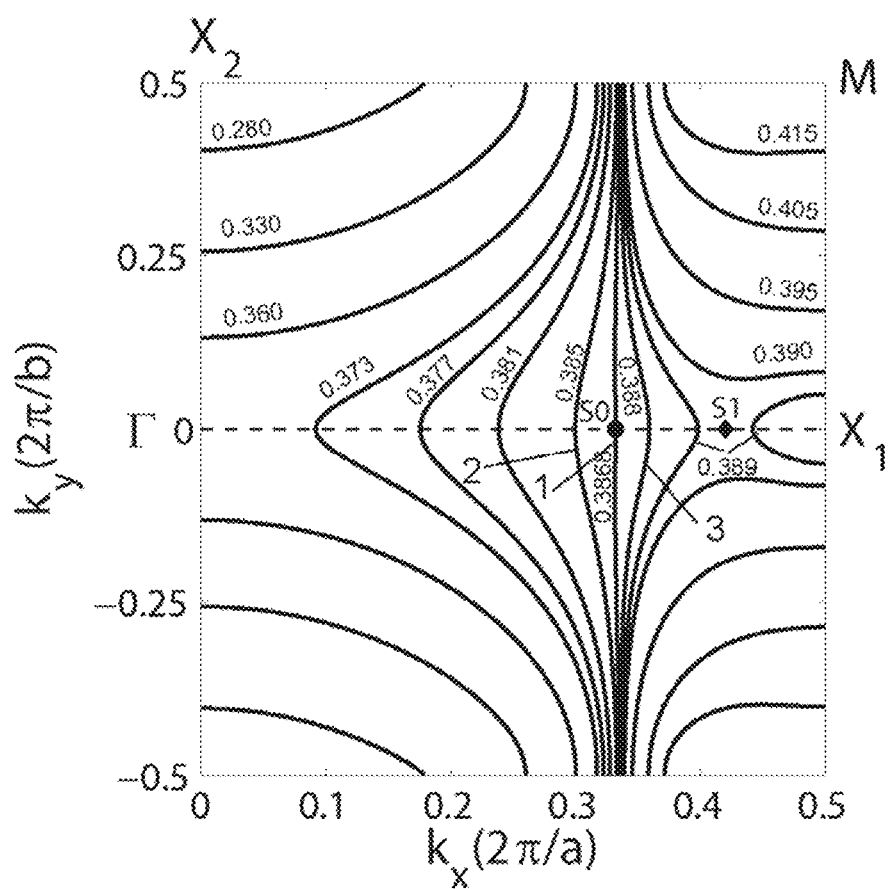
FIG. 2 shows equi-frequency contours of the second band of TE polarization of the photonic crystal as shown in FIG. 1.

FIG. 2 is shown to equi-frequency contours of the second band of TE polarization of the photonic crystal. From the figure, it can be seen that, the equi-frequency contour 1 is a straight line throughout a Brillouin zone, which represents a full-angle-ranged self-collimation phenomenon; S0 is the midpoint of the equi-frequency contour 1, i.e., the self-collimation point. At each side of the equi-frequency contour 1, a relative frequency offset of equi-frequency contour 2 and equi-frequency contour 3 is about −0.47% and 0.31%, respectively, relative to the frequency of equi-frequency contour 1; besides, both the equi-frequency contour 2 and equi-frequency contour 3 have obvious curves around $\Gamma X_1$ axis ($k_y=0$). Thus, the self-collimation phenomenon of the photonic crystal has very high frequency sensitivity, i.e., the curvature of the equi-frequency contour rapidly changes with frequency around the self-collimation point S0.

Relative to that in vacuum, the improvement of change rate of curvatures of the equi-frequency contours with frequency around the frequency of the self-collimation point of the photonic crystal, i.e., self-collimation frequency sensitivity γ can be calculated according to the following formula:

$$\gamma = \left(\frac{1}{c/\omega^2}\right)\partial\kappa/\partial\omega\bigg|_{\omega=\omega_{sc},k_y=0} = \left(\frac{1}{c/\omega^2}\right)\frac{\partial^3\omega}{\partial k_x \partial k_y^2}/v_g^2\bigg|_{\omega=\omega_{sc},k_y=0}, \quad (1)$$

wherein, κ represents a curvature of the equi-frequency contour, ω represents a frequency of the equi-frequency contour, $\omega_{sc}$ is a frequency of the self-collimation point, $k_x$ represents a component of wavevector along x direction, $k_y$ represents a component of wavevector along y direction, group velocity $v_g = \sqrt{(\partial\omega/\partial k_1)^2 + (\partial\omega/\partial k_2)^2}$, constant c is the velocity of light in vacuum, normalized base $c/\omega^2$ represents an absolute value of change rate of curvature κ of the equi-frequency contours with frequency ω in vacuum.

According to formula (1), the self-collimation frequency sensitivity of the photonic crystal in the embodiment is γ=745.50, that is to say, in the embodiment, the change rate of curvatures of the equi-frequency contours with frequency around the frequency of the self-collimation point of the photonic crystal is 745.50 times than that in vacuum. Therefore, the photonic crystal in the embodiment belongs to a photonic crystal supporting high frequency sensitivity self-collimation phenomenon.

Although, it is very difficult to prepare a photonic crystal with infinite height, those skilled in the art would know that, dispersion property of an ideal two dimensional photonic crystal may readily appear in a photonic crystal plate which is covered by high reflectance layers (metal or photonic band gap material) on top and bottom boundaries, thus it is possible to achieve the featured characteristics of such photonic crystal in practical application.

Second Embodiment

Figure 3:
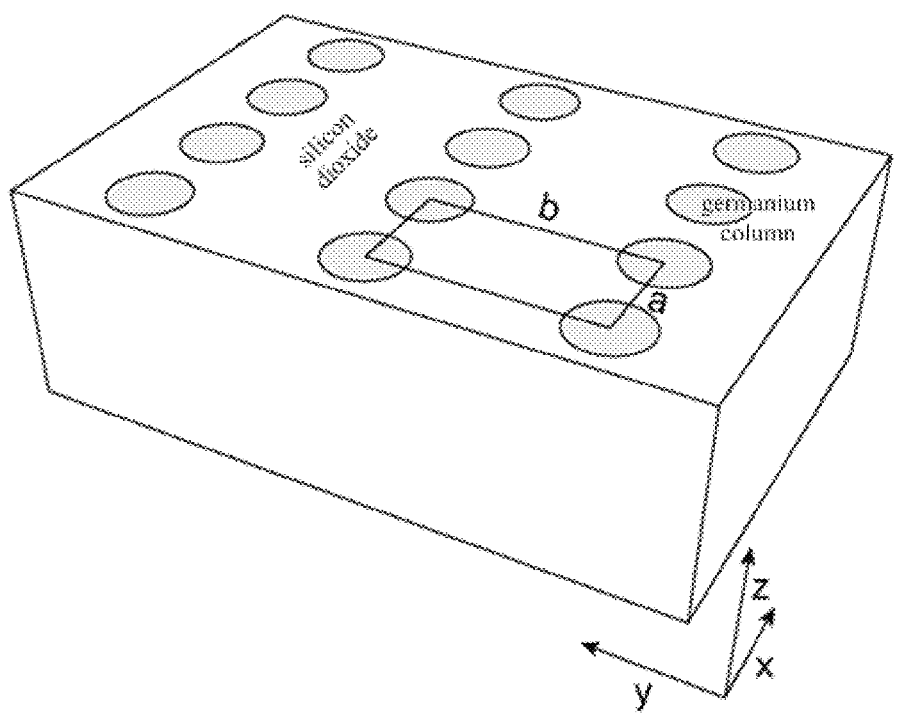
FIG. 3 shows a schematic diagram of another preferable photonic crystal supporting high frequency sensitivity self-collimation phenomenon of the present invention.

FIG. 3 is shown to a schematic diagram of another preferable photonic crystal supporting high frequency sensitivity self-collimation phenomenon. The photonic crystal is made of germanium columns arranged periodically in rectangular lattice in a silicon dioxide plate, wherein, the silicon dioxide plate has a refractive index of 1.45, the germanium column has a refractive index of 4.0, and a radius of r=0.35a, a thickness of the silicon dioxide plate and a height of the germanium column are h=2.0a, the formed rectangular lattice has a length of a at the short side, and a length of b=2.0a at the long side.

Figure 4:
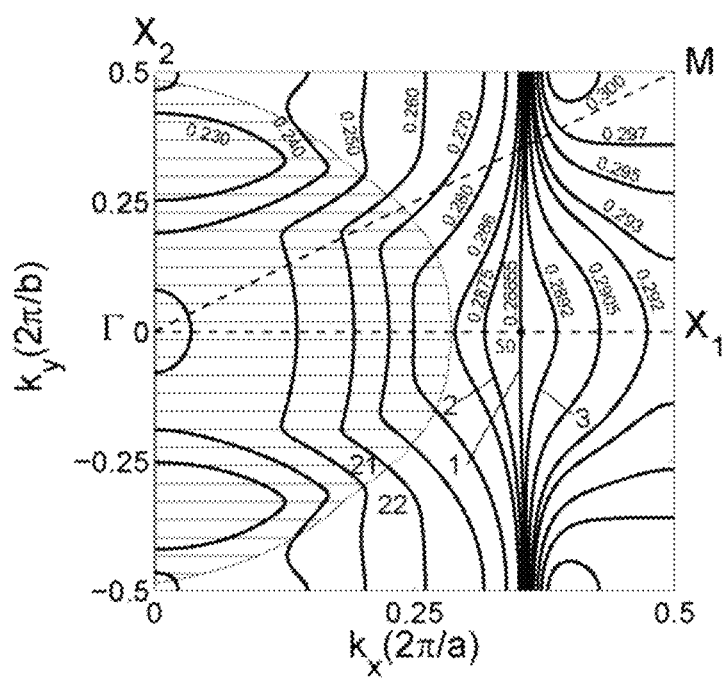
FIG. 4 shows equi-frequency contours of the fourth band of TE polarization of the photonic crystal as shown in FIG. 3.

FIG. 4 is shown to equi-frequency contours of the fourth band of TE polarization of the photonic crystal. From the figure, it can be seen that, the equi-frequency contour 1 is a straight line throughout a Brillouin zone, which represents a full-angle-ranged self-collimation phenomenon; S0 is the self-collimation point. At each side of the equi-frequency contour 1, a relative frequency offset of equi-frequency contour 2 and equi-frequency contour 3 is about −0.36% and 0.23%, respectively, relative to the equi-frequency contour 1; besides, both equi-frequency contour 2 and equi-frequency contour 3 have obvious curved around ΓX₁ axis ($k_y$=0). Thus, the self-collimation phenomenon of the photonic crystal has a very high frequency sensitivity, i.e., the curvature of the equi-frequency contour rapidly changes with frequency around the self-collimation point S0. In FIG. 4, the shadow area is a leaking mode area, in which the mode energy would be leaked outside the photonic crystal plate; the outside of the shadow area is a guided mode area, in which the mode energy would be effectively limited inside the photonic crystal plate. All equi-frequency contours 1, 2, 3 related to the high frequency sensitivity self-collimation phenomenon are within the guided mode area, thus it is stable for the modes thereof to stably propagate in the photonic crystal plate without substantial leaking loss.

According to formula (1), the self-collimation frequency sensitivity of the photonic crystal in the embodiment is γ=2600.30, that is to say, in the embodiment, the change rate of curvatures of the equi-frequency contours with frequency around the frequency of the self-collimation point of the photonic crystal is 2600.30 times than that in vacuum. Therefore, the photonic crystal in the embodiment belongs to a photonic crystal supporting high frequency sensitivity self-collimation phenomenon.

It is to be noted that, the above are only illustrations, rather than being used to limit the present invention. In fact, as long as manufacturing process permits, it is allowable to choose other materials to form a photonic crystal having the following characteristics:

It has a periodic distribution of refractive index formed by at least two kinds of materials; there are straight equi-frequency contours or flat equi-frequency surfaces in a certain band in a dispersion space of the photonic crystal, and change rate of curvatures of the equi-frequency contours or the equi-frequency surfaces with frequencies around the frequency of straight equi-frequency contours or flat equi-frequency surfaces is at least increased at least 50 times than the change rate in vacuum.

Figure 5:
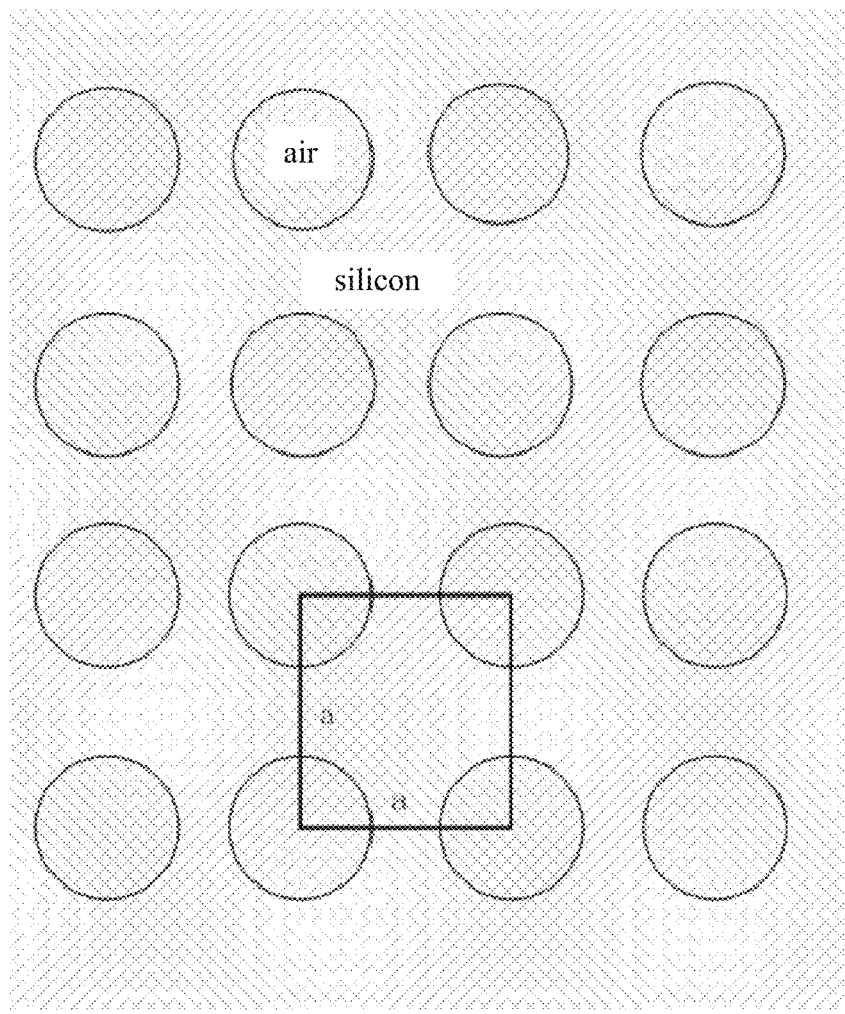
FIG. 5 shows a schematic diagram of a photonic crystal supporting common self-collimation phenomenon.
Figure 6:
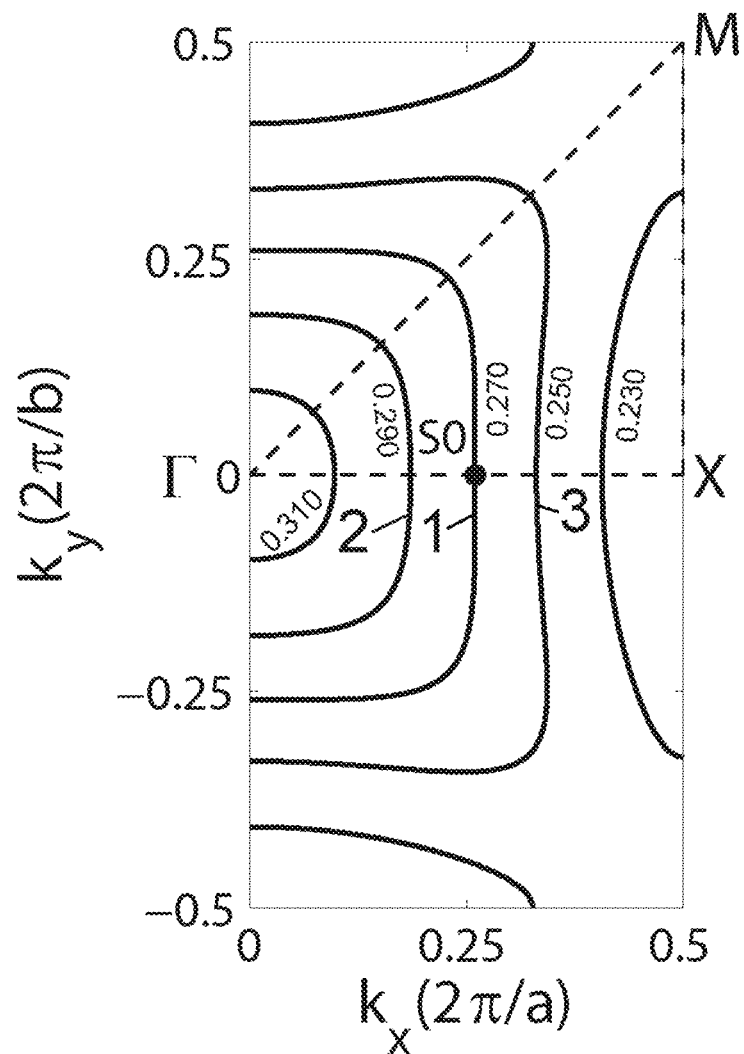
FIG. 6 shows equi-frequency contours of the second band of TE polarization of the photonic crystal as shown in FIG. 5.

In order to further embody the difference between the photonic crystal of the present invention and the photonic crystal supporting common self-collimation phenomenon, herein, a schematic diagram of a photonic crystal supporting common self-collimation phenomenon is provided as shown in FIG. 5, the photonic crystal in which is made of air holes of arranged periodically in square lattice in a silicon plate. Wherein, the thickness of the silicon plate and the height of the air holes are configured to be infinite, the formed square lattice has a side length of a, the air hole has a radius of 0.30a, and a refractive index of the silicon material is 3.4. FIG. 6 is shown to equi-frequency contours of the second band of TE polarization of the photonic crystal. From the figure, it can be seen that, the equi-frequency contour 1 has a straight section on ΓX₁ axis ($k_y$=0), which represents self-collimation phenomenon within a range of limited angle. A relative frequency offset of equi-frequency contour 2 and equi-frequency contour 3 is about −7.4% and 7.4%, respectively, relative to the equi-frequency contour 1, and the curvature around ΓX₁ axis is not obvious as well. According to formula (1), the self-collimation frequency sensitivity of the photonic crystal is γ=5.47, that is to say, the change rate of curvatures of the equi-frequency contours with frequency around the frequency of the self-collimation point of the photonic crystal is only 5.47 times than that in vacuum. Therefore, the photonic crystal does not belong to the photonic crystal supporting high frequency sensitivity self-collimation phenomenon of the present invention.

Figure 7:
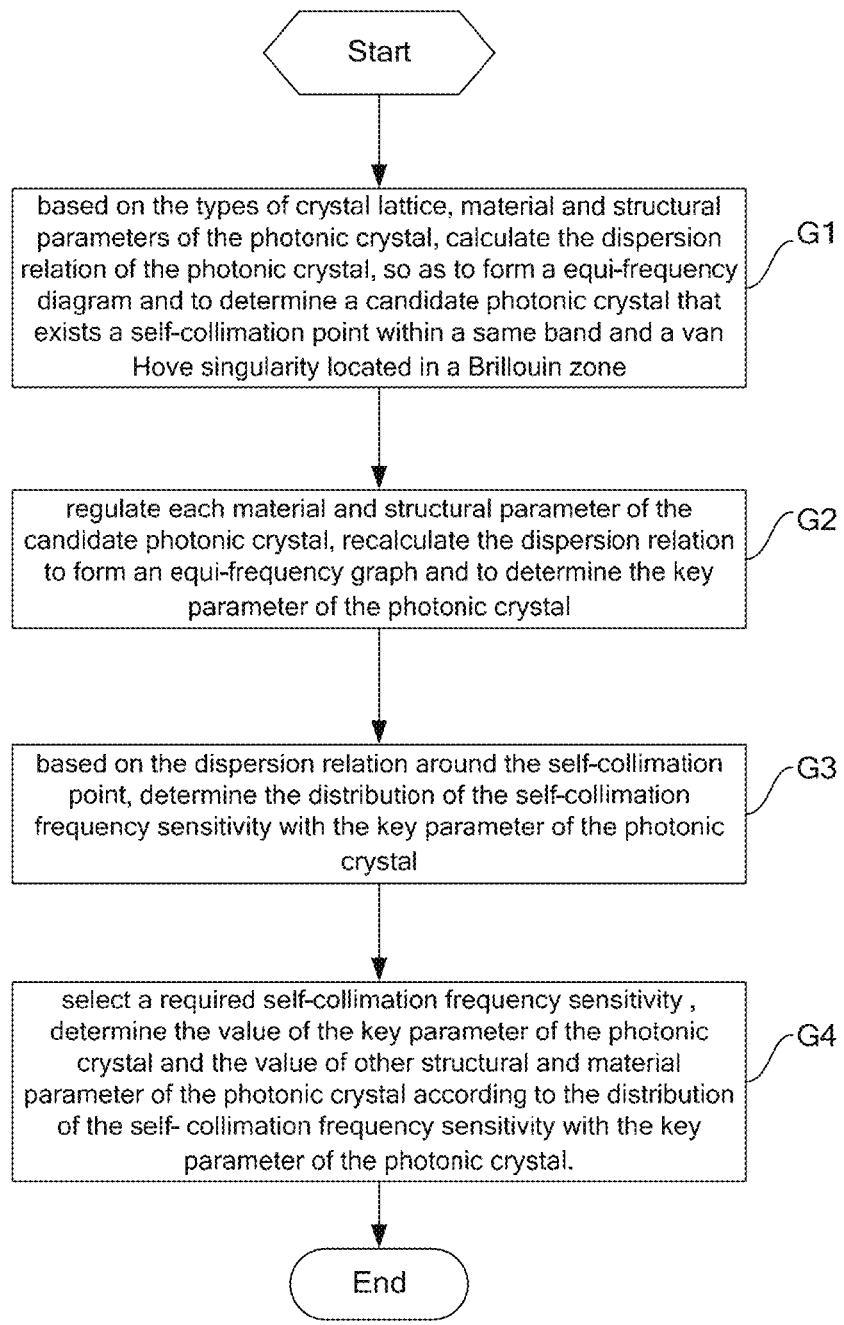
FIG. 7 shows a flow chart of a design method for a photonic crystal supporting high frequency sensitivity self-collimation phenomenon of the present invention.

As shown in FIG. 7, the present invention provides a design method for a photonic crystal supporting high frequency sensitivity self-collimation phenomenon.

In step G1, based on the types of crystal lattice, material and structural parameters of the photonic crystal, calculate the dispersion relation of the photonic crystal, so as to form a equi-frequency contours and to determine a candidate photonic crystal that exists a self-collimation point and a van Hove singularity located inside the Brillouin zone within the same band. Wherein, ω represents an eigenfrequency of the photonic crystal mode, κ represents a wavevector of the photonic crystal mode.

Wherein, the material parameter of the photonic crystal comprises materials of various refractive indexes, the structural parameter of the photonic crystal comprises shapes and sizes of various materials that constitutes the photonic crystal and lattice lengths of each direction thereof, the types of the van Hove singularity located in a Brillouin zone comprises one or more of a saddle-point-type van Hove singularity, a maximum-point-type van Hove singularity and a minimum-point-type van Hove singularity.

Wherein, an equi-frequency contour may be provided by adopting the plane wave expansion method, finite difference time domain (FDTD) method, or finite element method.

Specifically, provide an equi-frequency contours of a photonic crystal M1 based on the crystal lattice A1, material parameter B1 and structural parameter C1, if it can be seen from the equi-frequency contours that, there is not any self-collimation point and van Hove singularity located inside the Brillouin zone in the same band of the photonic crystal M1, then further provide an equi-frequency contours of the photonic crystal M2 based on the crystal lattice A2, material parameter B2 and structural parameter C2; . . . until there is a photonic crystal that exists a self-collimation point and one or more van Hove singularities located inside the Brillouin zone in a certain band and, and the photonic crystal is considered as a candidate photonic crystal.

Wherein, the self-collimation point is a midpoint of the straight equi-frequency contour, and the appearance of the self-collimation point represents straight equi-frequency contours resulting in a self-collimation phenomenon.

Figure 8:
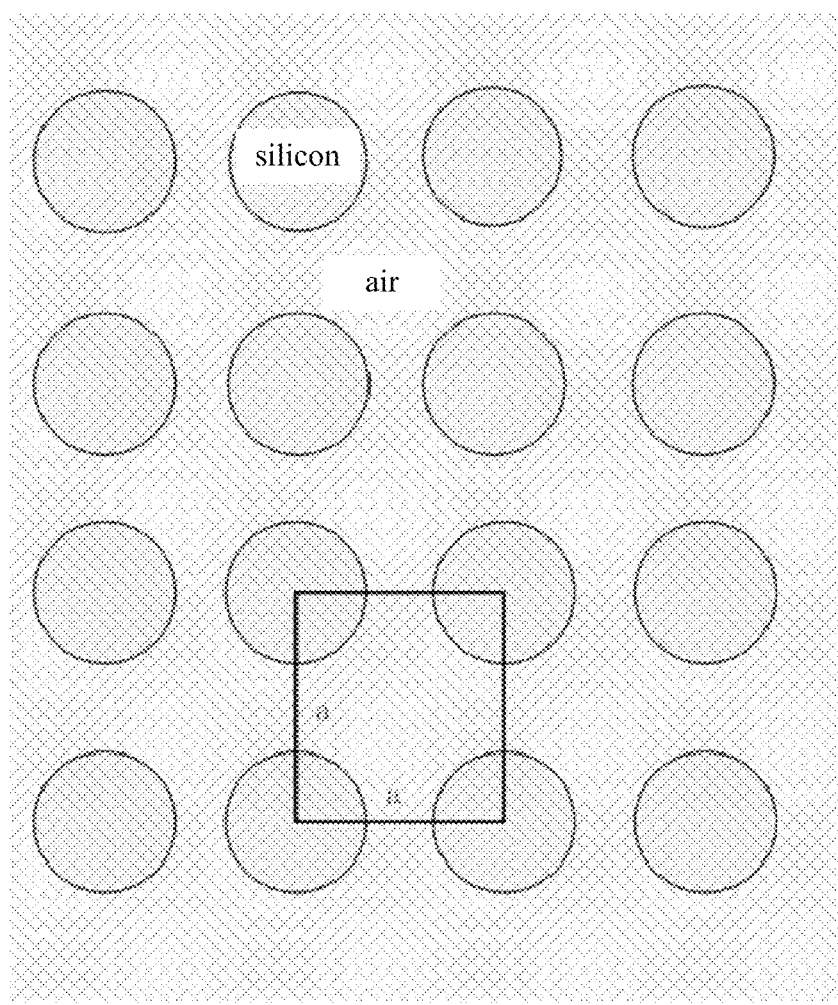
FIG. 8 shows a schematic diagram of a photonic crystal Mk of square crystal lattice.
Figure 9:
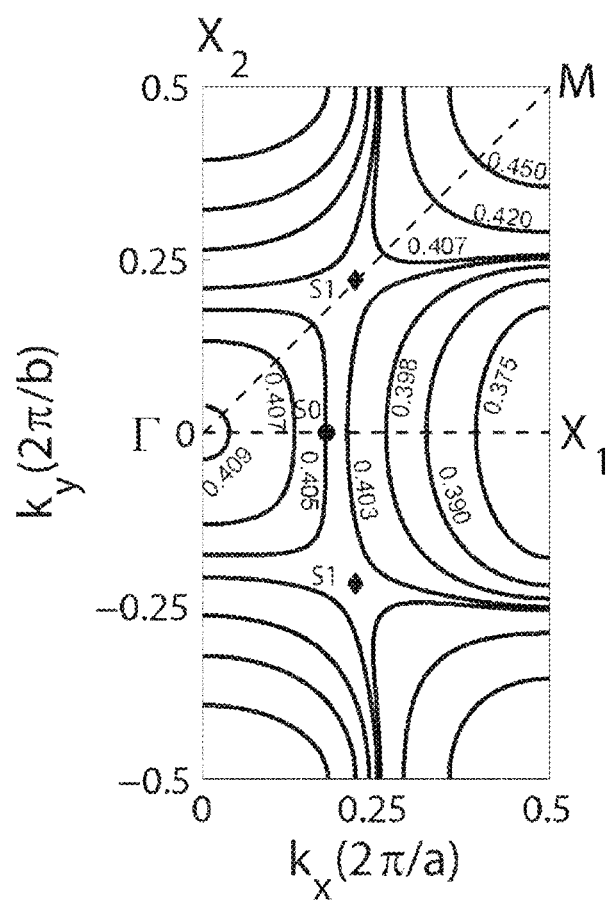
FIG. 9 shows equi-frequency contours of the second band of TE polarization of the photonic crystal Mk of square crystal lattice.

For example, FIG. 8 is shown to a photonic crystal of two dimension square lattice with a lattice constant of a, which is made of silicon columns (with a radius of r=0.30a) arranged periodically in square lattice in air background. FIG. 9 is shown to equi-frequency contours of the second band of TE polarization of a photonic crystal Mk. From the figure, it can be seen that, there are a saddle-point-type van Hove singularity S1 and a self-collimation point on ΓM axis, and the photonic crystal Mk is confirmed as a candidate photonic crystal.

In step G2, regulate each material and structural parameter of the candidate photonic crystal, recalculate the dispersion relation to form an new diagram of equi-frequency contours and to determine the key parameter of the photonic crystal, wherein, the key parameter of the photonic crystal refers to, the material and/or structural parameter of the photonic crystal as its value changes, it enables the van Hove singularity move close to or away from the self-collimation point.

Figure 10:
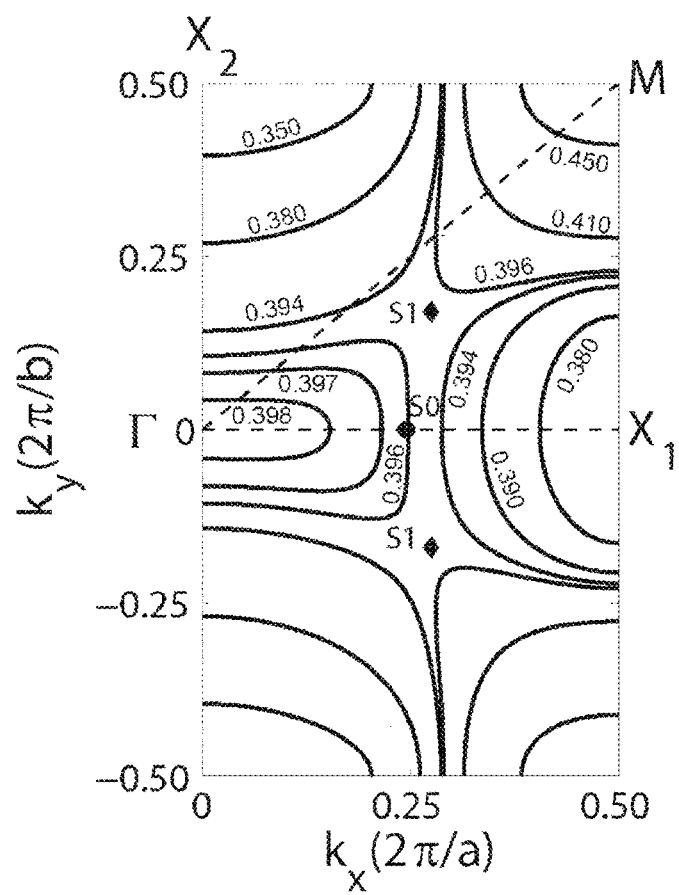
FIGS. 10 to 15 show equi-frequency contours of the second band of TE polarization of the photonic crystal Mk of square crystal lattice, with the proportional of the lattice constant being adjusted as 1.20, 1.40, 1.50, 1.60, 1.80, 2.00.
Figure 11:
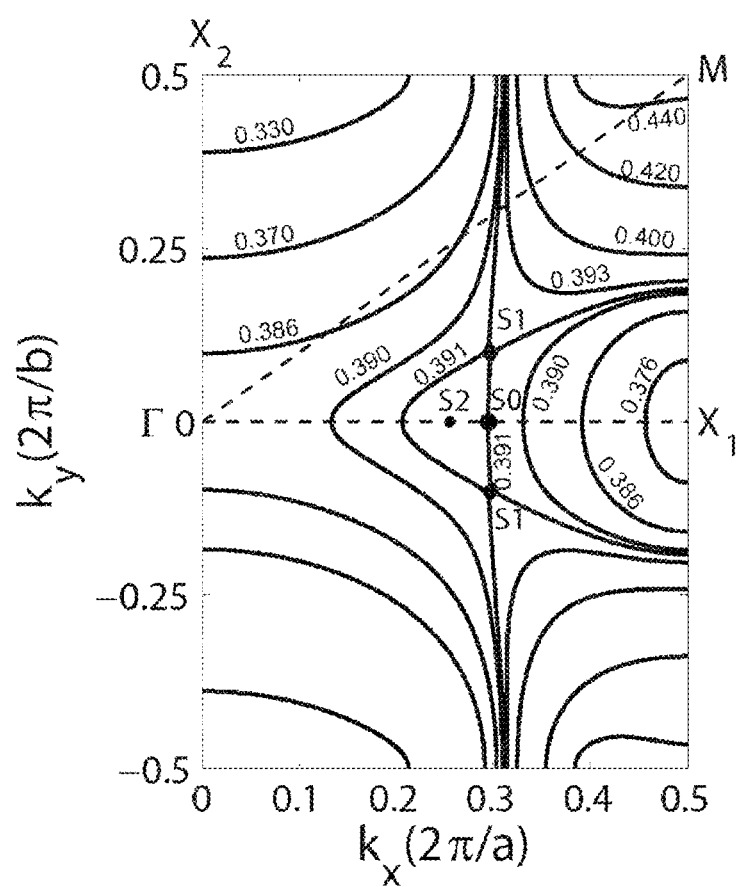
Figure 12:
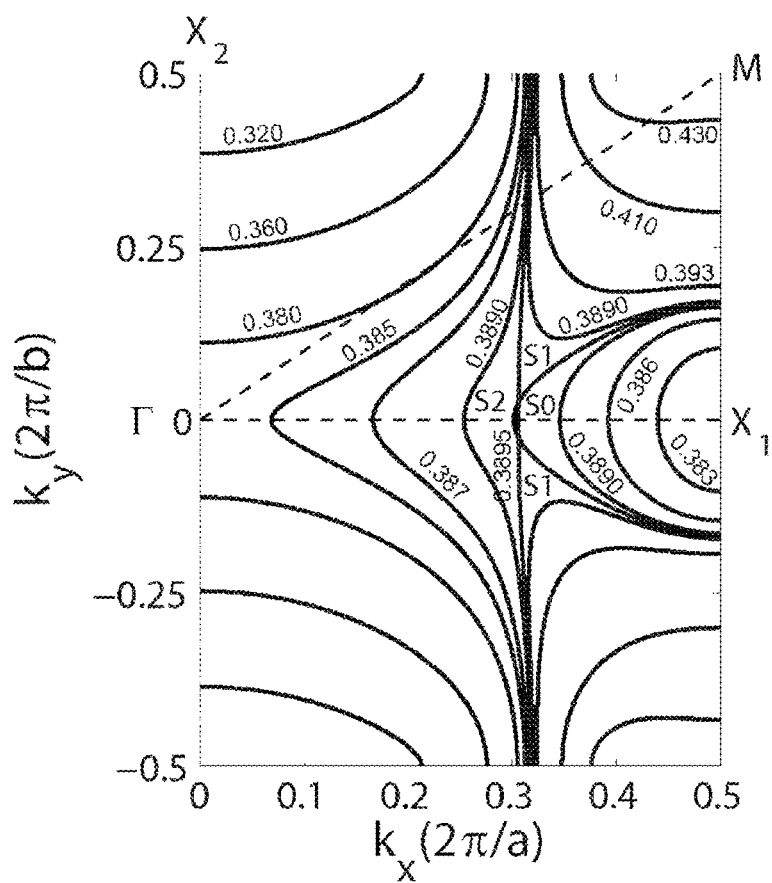
Figure 13:
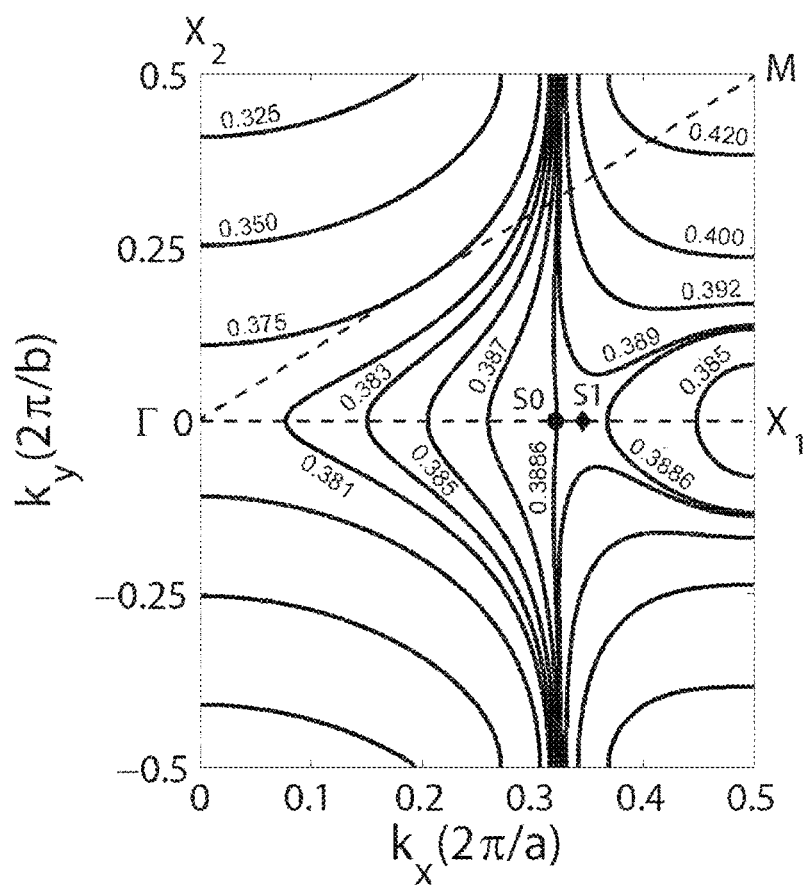
Figure 14:
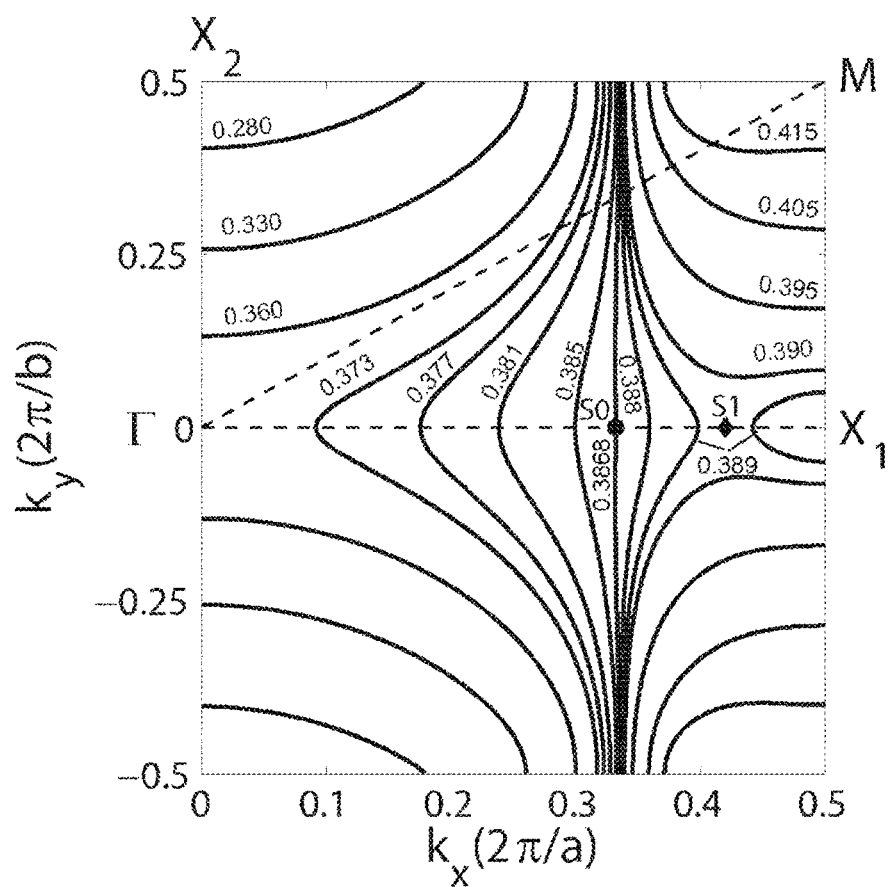
Figure 15:
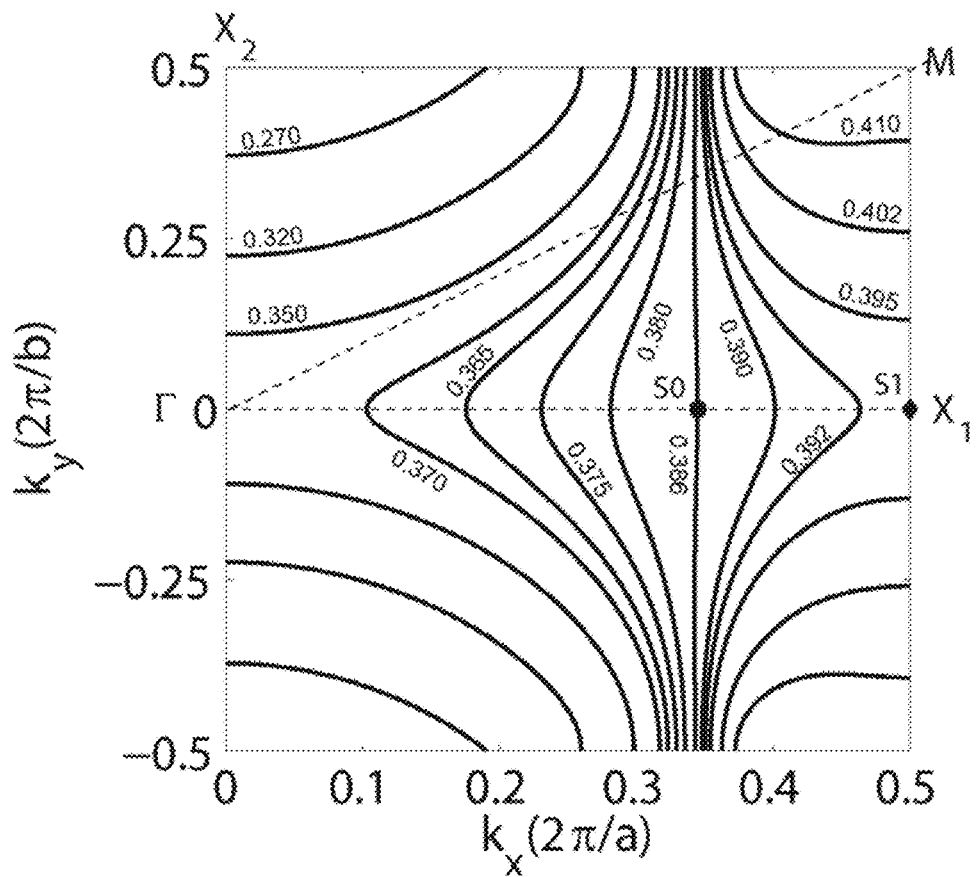

For example, modify the proportion of lattice aspect ratio of the abovementioned photonic crystal Mk, namely, the two dimension square lattice of the abovementioned photonic crystal Mk is changed into a two dimension rectangular lattice, and the aspect ratio of the two dimension rectangular lattice is set as $\beta=b/a$. When $\beta=1.20$, equi-frequency contours of the second band of TE polarization of the corresponding photonic crystal is shown in FIG. 10, and from the figure, it can be seen that, the saddle-point-type of van Hove singularity S1 deviates from the ΓM axis, and moves close to the self-collimation point S0. When regulating $\beta=1.40$, an equi-frequency contours of the second band of TE polarization of the corresponding photonic crystal is shown in FIG. 11, as compared to the situation of $\beta=1.20$ as shown in FIG. 10, the saddle-point-type van Hove singularity S1 moves closer to the position of the self-collimation point S0, and moreover, there exists a new maximum-point-type van Hove singularity S2 on the ΓX$_1$ axis. When $\beta=1.50$, equi-frequency contours of the second band of TE polarization of the corresponding photonic crystal is shown in FIG. 12, and from the figure, it can be seen that, both the van Hove singularities S1 and S2 are moved to a position that extremely closes to the self-collimation point S0. When regulating $\beta=1.60$, an equi-frequency contours of the second band of TE polarization of the corresponding photonic crystal is shown in FIG. 13, and from the figure, it can be seen that, the van Hove singularity S1 arrives at the ΓX$_1$ axis locating the self-collimation point S0, and passes over the position of the self-collimation point S0 as well, and meanwhile, the van Hove singularity S2 disappears. When $\beta=1.80$, an equi-frequency contours of the second band of TE polarization of the corresponding photonic crystal is shown in FIG. 14, and from the figure, it can be seen that, the van Hove singularity S1 still locates on the ΓX$_1$ axis, while compared to FIG. 13, the distance between the van Hove singularity S1 and the self-collimation point S0 becomes larger. When $\beta=2.00$, equi-frequency contours of the second band of TE polarization of the corresponding photonic crystal is shown in FIG. 15, and from the figure, it can be seen that, the van Hove singularity S1 moves to the position of point X$_1$ at a boundary of Brillouin zone, and features an even more distant from the self-collimation point S0. Thus, with regard to the photonic crystal Mk, it can be determined that: when its value changes, the key parameter of the photonic crystal enabling the mentioned van Hove singularity move close to or away from the self-collimation point is the proportion of crystal constant. In addition, from FIGS. 10 to 15, it can be seen that, the closer the distance between the van Hove singularity S1 and the self-collimation point S0 is, the smaller frequency difference between the straight equi-frequency contours and the equi-frequency contours having obvious curvature on two sides is, indicating a higher frequency sensitivity of self-collimation phenomenon.

In step G3, based on the dispersion relation around the self-collimation point, determine the distribution of the self-collimation frequency sensitivity γ with the key parameter of the photonic crystal.

Wherein, the change rate of curvatures κ of the equi-frequency contours (equi-frequency surfaces) with frequency ω around the self-collimation point is named as self-collimation frequency sensitivity. On the basis of the dispersion relation ω(κ) the photonic crystal calculated by a numerical method (such as, plane wave expansion method or FDTD method), the self-collimation frequency sensitivity can be calculated according to the following expression:

$$\gamma = \left(\frac{1}{c/\omega^2}\right)\partial\kappa/\partial\omega\bigg|_{\omega=\omega_{sc}, k_1=0} = \left(\frac{1}{c/\omega^2}\right)\frac{\partial^3\omega}{\partial k_2 \partial k_1^2}/v_g^2\bigg|_{\omega=\omega_{sc}, k_1=0}, \quad (2)$$

wherein, κ represents a curvature of the equi-frequency contour, ω represents a frequency of the equi-frequency contour, $\omega_{sc}$ is a frequency of the self-collimation point, $k_1$ represents a component of wavevector being parallel with the straight equi-frequency contours, $k_2$ represents a component of wavevector being perpendicular with the straight equi-frequency contours, group velocity $v_g = \sqrt{(\partial\omega/\partial k_1)^2 + (\partial\omega/\partial k_2)^2}$, constant c is the velocity of light in vacuum, normalized base $c/\omega^2$ represents an absolute value of change rate of curvature of the equi-frequency contours along with frequency in vacuum.

It is to be noted that, the dispersion relation of a homogeneous material with a refractive index of n is $\omega=ck/n$, since an equi-frequency contour with a frequency of ω is a circle with a radius of k=ωn/c, which has a curvature of κ=c/nω, the change rate of curvature of the equi-frequency contour with frequency in the homogeneous material is γ=∂κ/∂Ω=−c/nω²; due to the refractive index of vacuum is that $n_{vacuum}$=1.0, thus in vacuum, the change rate of curvature of the equi-frequency contour with frequency is γ=−c/ω².

Figure 16:
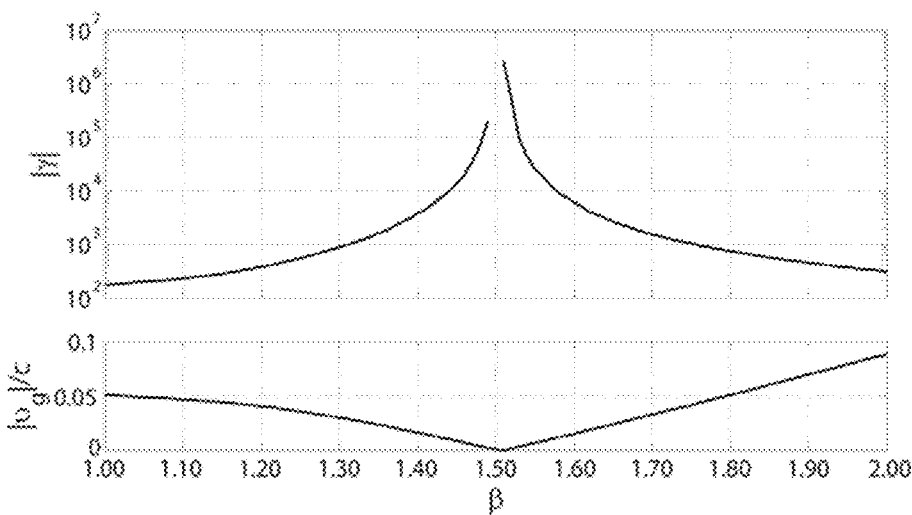
FIG. 16 shows a relationship diagram of self-collimation frequency sensitivity γ, group velocity at the self-collimation point S0 and the lattice aspect ratio β.

As shown in FIG. 16, as the lattice constant proportion β of the photonic crystal Mk calculated by the above formula (2) is varied from 1.0 to 2.0, the self-collimation frequency sensitivity γ is shown in FIG. 16. In addition, FIG. 16 also displays a change of group velocity with β at the self-collimation point. Form FIG. 16, it can be seen that, when β=1.51 (corresponding to the situation that the self-collimation point S0 is extremely close to the saddle-point-type van Hove singularities S1 and S2 in FIG. 12), the value of the self-collimation frequency sensitivity γ goes to infinity, and the group velocity at the self-collimation point S0 goes to zero. Thus, it may indeed significant improve the self-collimation frequency sensitivity by moving the van Hove singularities S1 and S2 located inside the Brillouin zone close to the position of the self-collimation point S0, along with a phenomenon that the group velocity at the self-collimation point S0 is decreased. Moreover, as shown in FIG. 16, as β=1.0~2.0, the values of the self-collimation frequency sensitivity γ are greater than 50, i.e., the change rate of curvatures of the equi-frequency contours with frequency around the frequency of the self-collimation point of the photonic crystal is at least 50 times than that in vacuum, which belongs to a scope of a high frequency sensitivity self-collimation phenomenon. Therefore, it may exist within a very wide parameter range that a high frequency sensitivity self-collimation phenomenon results from the approach of a van Hove singularity located inside the Brillouin zone to the self-collimation point.

It is to be noted that, even though the van Hove singularity located in a Brillouin zone would suddenly disappears for some reasons (the situation as shown in FIG. 14) or move to a boundary of the Brillouin zone (the situation as shown in FIG. 15), the high frequency sensitivity self-collimation phenomenon will exist stably. Therefore, the van Hove singularity located inside the Brillouin zone mentioned in the design method is simply used to determine the additional features of the photonic crystal supporting high frequency sensitivity self-collimation phenomenon, rather than being used to limit the photonic crystal supporting high frequency sensitivity self-collimation phenomenon.

In step G4, select a required self-collimation frequency sensitivity γ, determine the value of the key parameter of the photonic crystal and the value of other structural and material parameter of the photonic crystal according to the distribution of the self-collimation frequency sensitivity γ with the key parameter of the photonic crystal.

Specifically, on basis of different application scenarios and device performance, a designer would select a required self-collimation frequency sensitivity γ; then determine the value of the key parameter of the photonic crystal according to the selected self-collimation frequency sensitivity γ and the distribution of the self-collimation frequency sensitivity γ along with the key parameter of the photonic crystal, and determine the designed structural and material parameter of the photonic crystal based on other structural and material parameter values of the candidate photonic crystal. Generally, the higher the self-collimation frequency sensitivity is, the better the device performance is, but the slower the energy propagation velocity (i.e., group velocity), while the higher the accuracy requirement of operation frequency and structure is.

The photonic crystal of the present invention has wide application; preferably, it can be used to control diffraction of light beams.

The degree of diffraction of a light beam propagated in a photonic crystal is determined by the curvature of an equi-frequency contour. As for the photonic crystal of the present invention, the curvatures of the equi-frequency contour around the self-collimation point rapidly changes with frequency, thus it is possible to achieve the object of controlling diffraction of a light beam with specific frequency by selecting proper structural and material parameters for the photonic crystal. The direct effect of controlling diffraction of light beams is to control their propagation behavior. The types of the propagation behavior of light beams include convergence, collimation and divergence, which respectively refers to decrease, maintaining and increase tendency of the width of light beam with propagation distance. Usually, when the incident beam is the fundamental-mode Gaussian beam, as well as the waist position of the light beam (smallest width, where curvature of wavefront is zero) is in front of the incident end face of the photonic crystal, positive diffraction (the curvature of equi-frequency contour is positive value) will lead to a diverging behavior of light beam, zero diffraction (the curvature of equi-frequency contour is zero) will lead to a collimating behavior of light beam, while negative diffraction (the curvature of equi-frequency contour is negative value) will lead to a converge behavior of light beam.

Specifically, material, structural parameters and size of the photonic crystal are determined according to the frequency and the width of the light beam intended to be regulated, wherein, the material and structural parameters of the photonic crystal determine the curvature of equi-frequency contours at frequency of the light beam, i.e., degree of diffraction of the light beam. While the lateral size of the photonic crystal determines the capacity of the largest width of light beam, the longitudinal size determines the length of the paths of light beam; the lateral size and the longitudinal size of the photonic crystal respectively refers to the direction being parallel with or perpendicular with the self-collimation direction, namely the size relative to the propagation direction of light beam. After that, construct a piece of limited sized photonic crystal supporting high frequency sensitivity self-collimation phenomenon based on the determined material, structural parameters and size, and there is free space having homogenous refractive index around the photonic crystal; next, a light beam whose diffraction is to be controlled is launched from the free space into the photonic crystal along the self-collimation direction, and then, receive an outgoing beam in the free space at the other side of the photonic crystal.

In addition, it is possible to achieve a tunable control of the degree of diffraction of light beams, by changing the refractive index of the photonic crystal through material nonlinearity. As the refractive index of a certain component of the photonic crystal changes, the self-collimation frequency will be shift, and meanwhile change the curvature of the equi-frequency contours at the operation frequency. Therefore, it is possible to achieve tunable control of diffraction of light beams by changing of refractive index of the photonic crystal.

Figure 17:
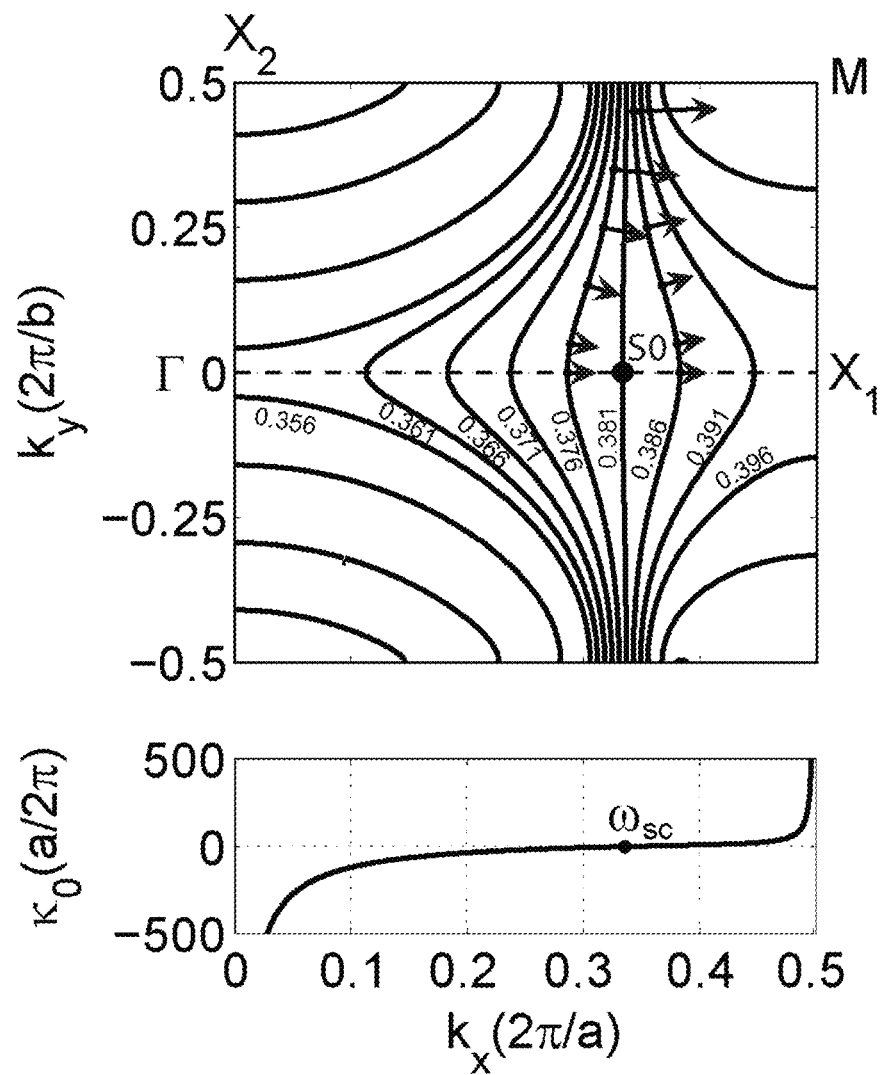
FIG. 17 shows equi-frequency contours of the second band of TE polarization and a distribution of curvature of equi-frequency contours on $\Gamma X_1$ axis of a photonic crystal Mi.

For example, construct a photonic crystal Mi, which is made of silicon columns arranged periodically in rectangular lattice in air background. The rectangular lattice has a lattice length of a and b=2.0a on x direction and y direction, respectively, and the silicon column has a radius of 0.30a, and the refractive index of the silicon material is n=3.4. The upper of FIG. 17 is shown to an equi-frequency contours of the photonic crystal, it can be seen that, the straight equi-frequency contours 1 representing self-collimation phenomenon has a frequency of 0.381(2πc/a), and its equi-frequency contours on two sides have obvious curves around the $\Gamma X_1$ axis, and the curvature increases with the increase of its difference from the self-collimation frequency. The bottom of FIG. 17 is shown to a distribution of curvature of equi-frequency contours on $\Gamma X_1$ axis, wherein, the expression of the curvature of equi-frequency contours on $\Gamma X_1$ axis is:

$$\kappa = [(\partial^2 \omega / \partial k_y^2) / v_g] |_{k_y=0} \quad (3)$$

Wherein, both $\partial^2 \omega / \partial k_y^2$ and $v_g|_{k_y=0} = \partial \omega / \partial k_x$ can be calculated by the dispersion relation ω(k). From the bottom of FIG. 17, it can be seen that, the curvature κ of equi-frequency contours continuous changes with $k_x$, and at the left side of the self-collimation equi-frequency contours 1 ($\omega < \omega_{sc}$), the curvature κ of equi-frequency contours is negative value, while at the right side of the self-collimation equi-frequency contours 1 ($\omega > \omega_{sc}$), the curvature κ of equi-frequency contours is positive value. The arrows of the equi-frequency contours 2 and 3 at the upper of the FIG. 17 indicate the size and direction of the group velocity at the starting point of the arrows. One can see that, as for the equi-frequency contours 2 of κ<0, the group velocity deflects inwardly, indicating a converge behavior of light beam; while as for the equi-frequency contours 3 of κ>0, the group velocity deflects outwardly, indicating a diverging behavior of light beam.

Figure 18:
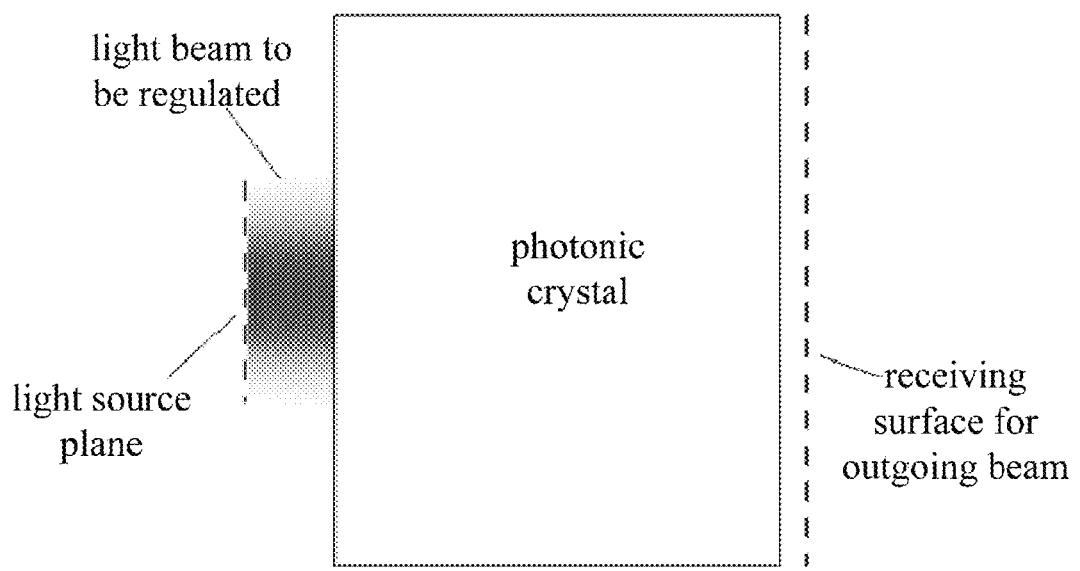
FIG. 18 shows a schematic diagram of a light beam launching into a photonic crystal.

The light beam whose diffraction is to be controlled is launched from the free space into the photonic crystal Mi with a size of 150a×150b along the self-collimation direction (i.e. the direction of $\Gamma X_1$ axis), and then, an outgoing beam is received in the free space at the other side of the photonic crystal Mi, as shown in FIG. 18. Wherein, the field amplitude expression of the incident light beam in the source plane is set as:

$$H_z(y) = H_{z0} \cdot \exp[i 2\pi y^2 / aR - y^2/(2W^2)] \quad (4)$$

Wherein, W=27.0a determines the width of light beam, R=3241.0a determines the wavefront curvature.

Figure 19A:
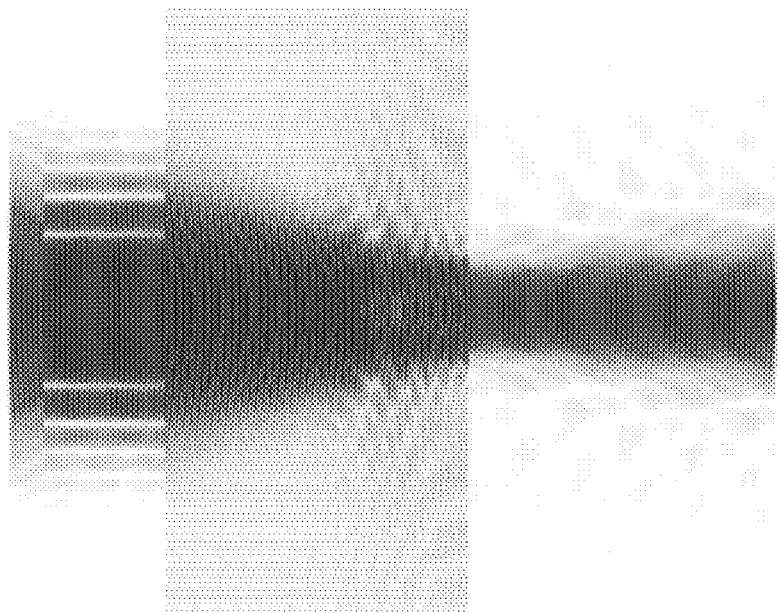
FIGS. 19a to 19c show a schematic diagram of the effects a photonic crystal Mi controlling diffraction of light beams with varied frequencies.
Figure 19B:
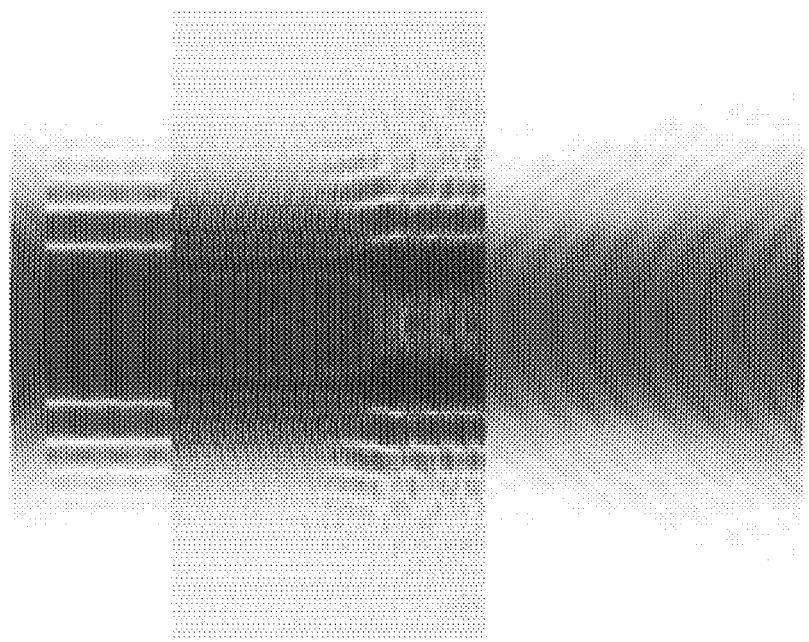
Figure 19C:
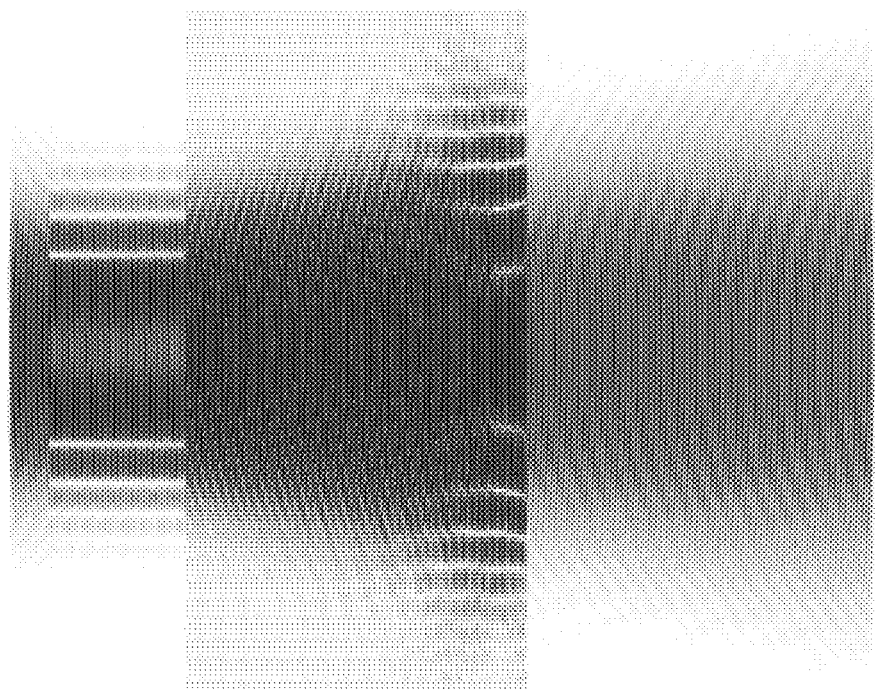

FIGS. 19a to 19c display the effects of diffraction control of light beams with varied frequencies using the photonic crystal Mi, which are the instant distributions of $H_z$ field component of light beam after completely penetrating the photonic crystal Mi obtained by FDTD simulation according to the arrangement in FIG. 18 and the material, structural parameters and size of the photonic crystal described above. Once a light beam is incident into the photonic crystal, its diffraction is determined by the curvature of the equi-frequency contours. With regard to FIG. 19a, the frequency of light beam is 0.376(2πc/a), and the curvature of the equi-frequency contours is negative value, thus the propagation behavior of the light beam is converge, i.e., the width of light beam gradually decreases during the propagation process. With regard to FIG. 19b, the frequency of light beam is 0.381(2πc/a), and the curvature of the equi-frequency contours is zero, thus the propagation behavior of the light beam is collimating, i.e., the width of light beam remains the same during the propagation process. With regard to FIG. 19c, the frequency of light beam is 0.386 (2πc/a), and the curvature of the equi-frequency contours is positive value, thus the propagation behavior of the light beam is divergent, i.e., the width of light beam gradually increases during the propagation process.

Figure 20:
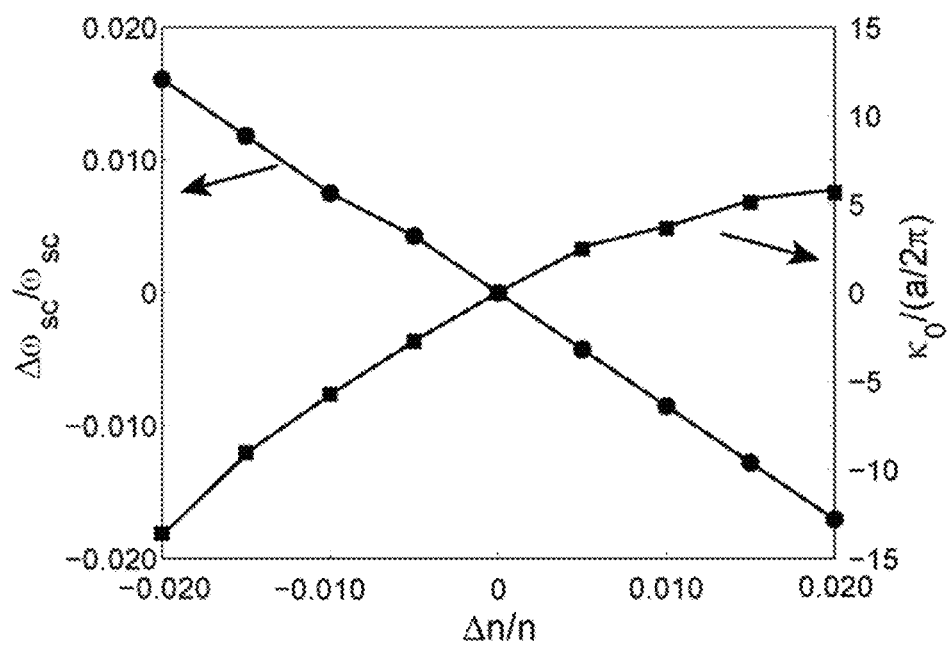
FIGS. 20 to 21 show a schematic diagram of achieving tunable control of degree of diffraction of light beam by changing the refractive index of silicon columns that constitute a photonic crystal.
Figure 21:
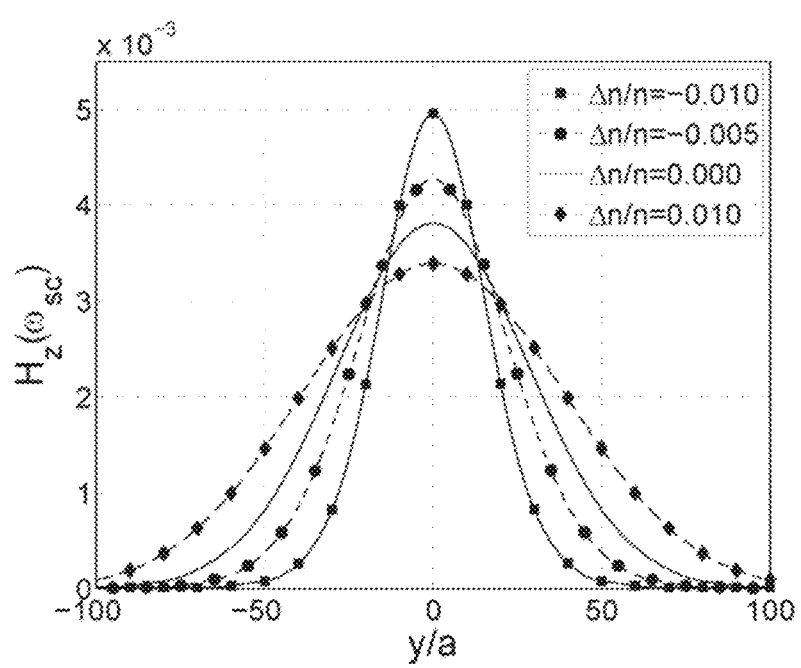

In addition, FIGS. 20 and 21 display tunable control of diffraction of light beam achieved by changing the refractive index of silicon column that constitutes a photonic crystal. Wherein, FIG. 20 shows a relationship diagram between the relative change Δn/n of the refractive index of silicon columns and self-collimation frequency and curvature of equi-frequency contours. From the figure, it can be seen that, as the refractive index of silicon column n increases, the self-collimation frequency $\omega_{sc}$ will decrease, while the curvature of equi-frequency contours κ at the original self-collimation frequency ω=0.381(2πc/a) will increase accordingly. FIG. 21 displays the impact of the change of refractive index of silicon column n on the outline of beam light at the receiving face of outgoing beam, as the frequency of the beam light is $\omega_{sc}$=0.381(2πc/a). From the figure, it can be seen that, compared to the case of Δn/n=0, when Δn/n<0, the width of light beam is narrowing obviously, while when Δn/n>0, the width of light beam is increasing obviously, indicating that the change of the refractive index of silicon column n is indeed capable for effectively changing the degree of diffraction of light beam propagated in the photonic crystal.

Preferably, the photonic crystal of the present invention can also be used to detect refractive index.

With regard to the photonic crystal of the present invention, the curvature of the equi-frequency contours around the self-collimation frequency rapid changes with frequency, thus a small change of the refractive index of a certain or some certain component of the photonic crystal may significantly change the diffraction of light beams, while the change of the diffraction of a light beam would affect a centre intensity of the light beam after penetrating the photonic crystal. Therefore, it is possible to detect a small change of the refractive index of a certain or some certain component of the photonic crystal by measuring the centre intensity of the light beam after penetrating the photonic crystal.

Specifically, firstly provide a piece of photonic crystal supporting high frequency sensitivity self-collimation phenomenon, and there exists periodic interspaces for filling the sample to be tested (gas or liquid) in the photonic crystal. Then, respectively fill with various kinds of materials of known refractive index (may be gas or liquid and etc.) in the periodic distributed interspaces in the photonic crystal, the detecting beam light is launched into the photonic crystal filled with materials of known refractive index along the self-collimation direction, and a light intensity detector is placed for detecting a centre intensity of the light beam on the other side of the photonic crystal, to measure the centre intensity of the light beam, such that a correlation chart between the refractive index of each material of known refractive index and the intensity of outgoing beam can be determined. Next, fill the interspaces of periodic configuration in the photonic crystal with sample to be tested, and measure the intensity of light beam, then based on the determined correlation chart between the known refractive index and the intensity of outgoing beam, and the measured intensity of light beam of the sample to be tested, the refractive index of the sample to be tested can be determined.

For example, adopt a piece of photonic crystal Mj with a size of 100a×100b, which is made of silicon columns of periodic configuration by rectangular lattice in air background. The rectangular lattice has a lattice length of a and b on x direction and y direction, respectively, and b=2.0a.

The silicon column has a radius of 0.35a, and the refractive index of the silicon material is n=3.4. Gas or liquid sample is filled into the region between the silicon columns in the photonic crystal, which region is named as a background region of photonic crystal, the refractive index of which is labeled as $n_{bg}$, and the change of $n_{bg}$ is labeled as $\Delta n_{bg}$.

Figure 22A:
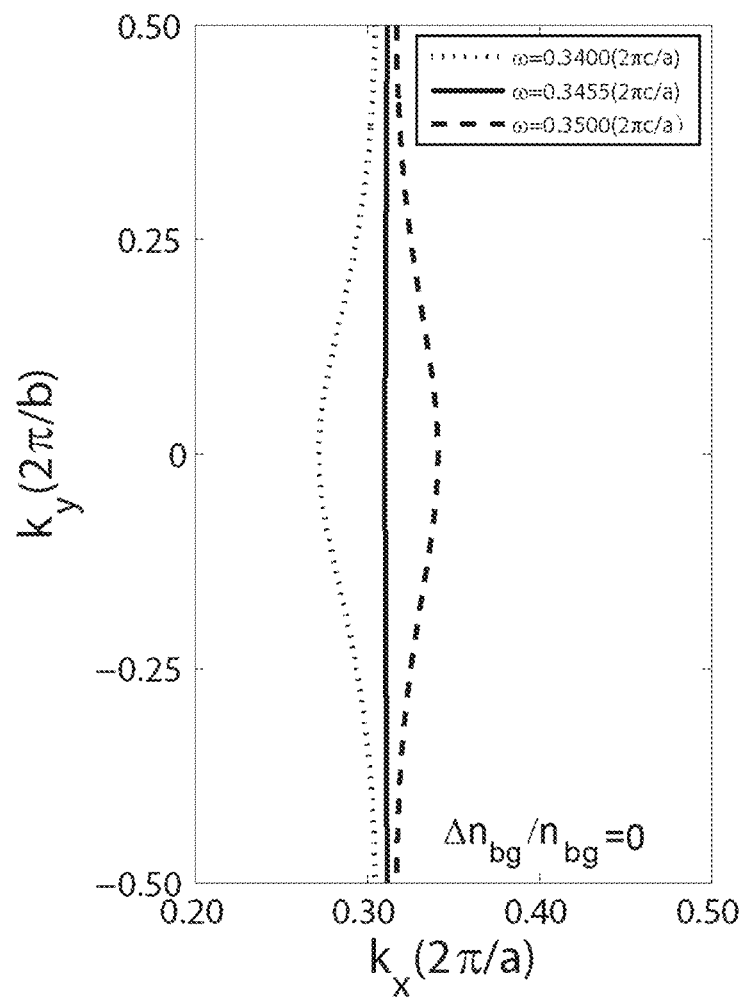
FIGS. 22a to 22c show equi-frequency contours of the second band of TE polarization of the photonic crystal around the self-collimation frequency as $\Delta n_{bg}/n_{bg}=0$, $\Delta n_{bg}/n_{bg}=0.025$, $\Delta n_{bg}/n_{bg}=0.050$.
Figure 22B:
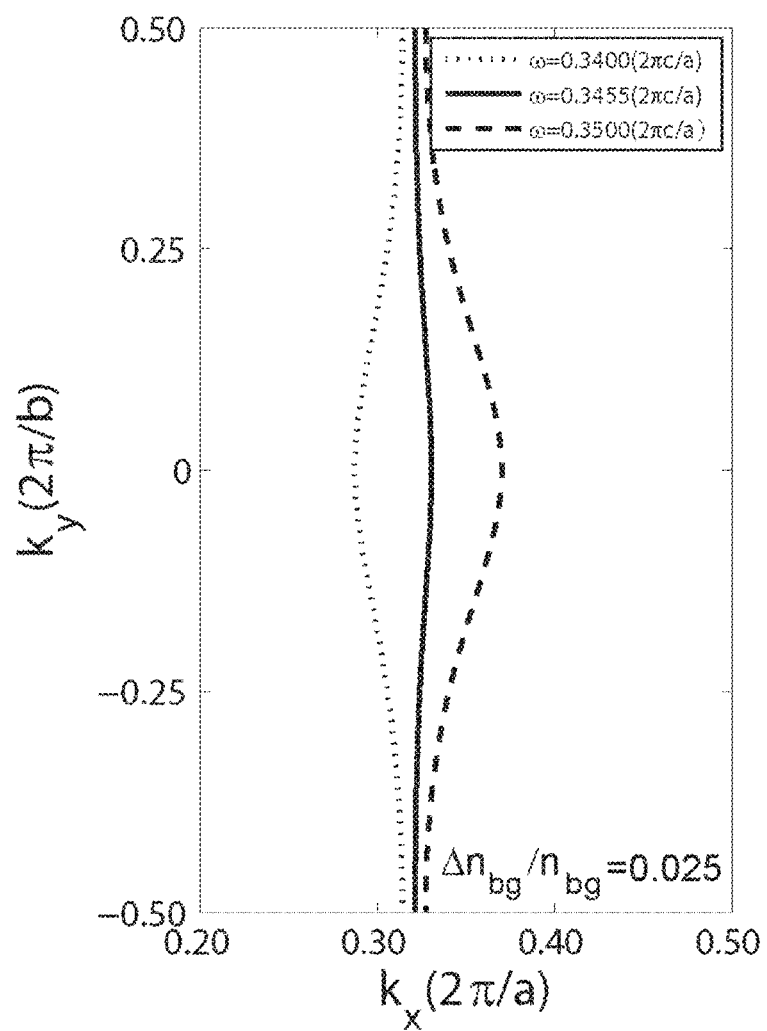
Figure 22C:
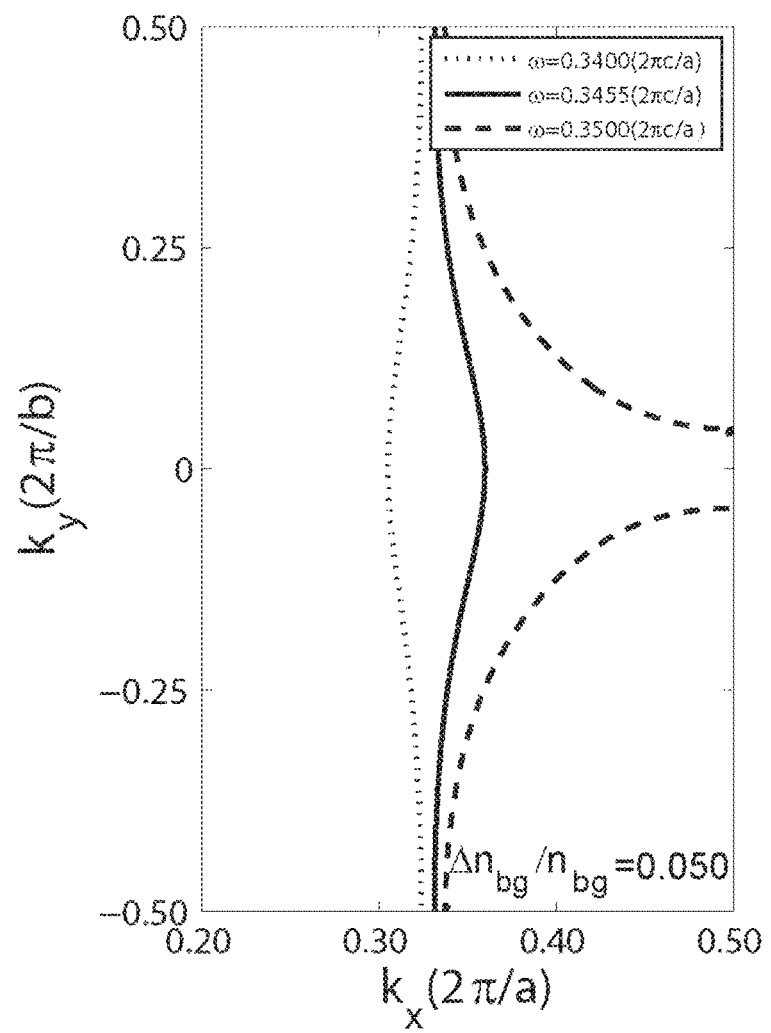
Figure 23:
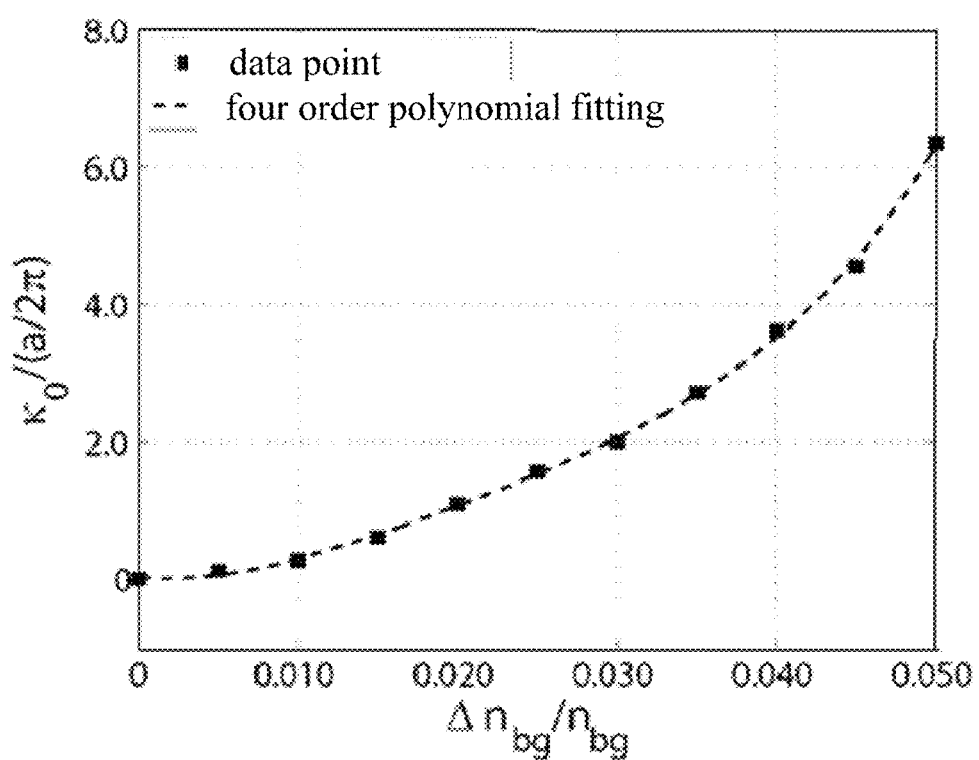
FIG. 23 shows a schematic diagram of changes of curvature of equi-frequency contours at $$\omega = 0.3455\left(\frac{2\pi c}{a}\right)$$

FIGS. 22a and 23 display the impact of the change of refractive index $n_{bg}$ in the background region on the curvature of equi-frequency contour around the self-collimation frequency. FIGS. 22a, 22b, 22c are equi-frequency contours of the second band of TE polarization of the photonic crystal around the self-collimation frequency, which correspond to the situation of $\Delta n_{bg}/n_{bg}=0$, $\Delta n_{bg}/n_{bg}=0.025$, $\Delta n_{bg}/n_{bg}=0.050$, respectively. When respectively comparing the dotted lines, full lines and dashed lines in FIGS. 22a to 22c, one can see that, the refractive index $n_{bg}$ is relatively increase of 0.05, to make the entire equi-frequency contours shift to the right, and to make the curvature of the equi-frequency contours obviously increase at same time. FIG. 23 shows the change of the curvature of the equi-frequency contours κ with $n_{bg}$ at ω=0.3455(2πc/a), one can see that, at ω=0.3455(2πc/a), the curvature of the equi-frequency contours κ increases monotonically with the increase of $n_{bg}$, which approximately satisfies four order polynomial fitting.

FIG. 24 displays the relation between centre intensity of outgoing beam and $n_{bg}$ obtained by FDTD simulations and based on the material, structural parameters and the like of the photonic crystal Mj. One can see that, the centre intensity of outgoing beam decreases monotonically with the increase of $n_{bg}$, which approximately satisfies a quadratic function fitting.

Since in the setting measurement range of $n_{bg}$, the centre intensity of light beam changes monotonically with $n_{bg}$, thus with regard to the sample of unknown refractive index, after being filled in the background of the photonic crystal, the refractive index of the sample can be determined according to the centre intensity of outgoing beam, and by reference to the chart as shown in FIG. 24.

In actual operation, the measured sensitivity and range of refractive index may be changed flexibly as required. For example, by selecting a photonic crystal with higher self-collimation frequency sensitivity or increasing the longitudinal dimension of a photonic crystal, it enables to increase the change of the centre intensity of outgoing beam with the change of refractive index in the background region, so as to improve the measured sensitivity of refractive index. When selecting a photonic crystal with lower self-collimation frequency sensitivity or limiting the filling region of sample, to make the resulting change of curvature of equi-frequency contours by a same change of the refractive index smaller, it enables to broaden the measured range of refractive index.

To sum up, since the photonic crystal supporting high frequency sensitivity self-collimation phenomenon and having a characteristic of low group velocity features rapid changes of the curvatures of equi-frequency contours (equi-frequency surfaces) around the self-collimation point with frequency, and the diffracted intensity of light beam is readily influenced by frequency shift and change of material refractive index, it enables to be used to construct devices of excellent property, such as diffraction modulator of light beam, detector of refractive index and the like, and has wide application prospect.

The abovementioned embodiments only illustratively describe the principle and efficacy of the present invention, rather than being used to limit the present invention. Any person skilled in the art may modify or amend the abovementioned embodiments without departing from the spirit and scope of the present invention. Thus, all equivalent modifications or amendments accomplished by persons having common knowledge in the technical field concerned without departing from the spirit and technical thoughts revealed by the present invention shall still be covered by the claims of the present invention.

What is claimed is:

1. A photonic crystal supporting highly frequency-sensitive self-collimation phenomenon having a periodic distribution of refractive index formed by at least two kinds of materials, wherein the photonic crystal has straight equi-frequency contours or flat equi-frequency surfaces in a certain band within a first Brillouin zone of wave-vector space of the photonic crystal, and a frequency-sensitivity of self-collimation is at least 50 times higher than a change rate of curvatures of the equi-frequency contours or the equi-frequency surfaces with frequencies in a vacuum.

2. The photonic crystal supporting highly frequency-sensitive self-collimation phenomenon according to claim 1, characterized in that, the frequency-sensitivity of self-collimation is:

$$\gamma = \left(\frac{1}{c/\omega^2}\right)\partial\kappa/\partial\omega\bigg|_{\omega=\omega_{sc},k_1=0} = \left(\frac{1}{c/\omega^2}\right)\frac{\partial^3\omega}{\partial k_2 \partial k_1^2}/v_g^2\bigg|_{\omega=\omega_{sc},k_1=0}$$

wherein, κ represents a curvature of the equi-frequency contour, ω represents a frequency of the equi-frequency contour, $\omega_{sc}$ is a frequency of the self-collimation point, $k_1$ represents a component of wavevector being parallel with the straight equi-frequency contours, $k_2$ represents a component of wavevector being perpendicular with the straight equi-frequency contours, group velocity $v_g=\sqrt{(\partial\omega/\partial k_1)^2+(\partial\omega/\partial k_2)^2}$, constant c is the velocity of light in vacuum, normalized base $c/\omega^2$ represents an absolute value of change rate of curvature κ of the equi-frequency contours with frequency ω in vacuum.

3. The photonic crystal supporting highly frequency-sensitive self-collimation phenomenon according to claim 1, characterized in that, the photonic crystal has van Hove singularities, by changing some structural or material parameters of the photonic crystals, the van Hove singularities can be moved close to the straight equi-frequency contours or the flat equi-frequency surfaces, and frequency-sensitivity of self-collimation γ is enhanced.

4. The photonic crystal supporting highly frequency-sensitive self-collimation phenomenon according to claim 1, there exist one or more zero group velocity points, by changing some structural or material parameters of the photonic crystals, the one or more van Hove singularities may be moved away from the straight equi-frequency contours or the flat equi-frequency surfaces, and even moved out of the first Brillouin zone, the highly frequency-sensitive self-collimation phenomenon still exist.

5. The photonic crystal supporting highly frequency-sensitive self-collimation phenomenon according to claim 1, characterized in that, the frequency sensitivity of self-collimation γ is sensitive to structure parameters and material parameters of the photonic crystal, so the photonic crystal can be used for sensitive detectors for these physical parameters.

* * * * *